United States Patent
Yeung et al.

(10) Patent No.: US 11,593,106 B1
(45) Date of Patent: Feb. 28, 2023

(54) CIRCUITS AND METHODS FOR VECTOR SORTING IN A MICROPROCESSOR

(71) Applicant: Apple Inc., Cupertino, CA (US)

(72) Inventors: On Wa Yeung, San Diego, CA (US); Seydou N. Ba, Cedar Park, TX (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/448,865

(22) Filed: Sep. 24, 2021

(51) Int. Cl.
*G06F 9/30* (2018.01)
*G06F 15/82* (2006.01)

(52) U.S. Cl.
CPC ........ *G06F 9/30036* (2013.01); *G06F 9/3013* (2013.01); *G06F 15/82* (2013.01)

(58) Field of Classification Search
None
See application file for complete search history.

(56) References Cited

U.S. PATENT DOCUMENTS

| | | | |
|---|---|---|---|
| 5,226,135 A * | 7/1993 | Mishina | G06F 7/24 712/7 |
| 5,287,494 A | 2/1994 | Garcia et al. | |
| 5,408,675 A | 4/1995 | Florentino et al. | |
| 5,900,006 A | 5/1999 | Yoon | |
| 6,987,401 B1 | 1/2006 | Langhammer et al. | |
| 8,989,317 B1 | 3/2015 | Holden et al. | |
| 9,405,538 B2 * | 8/2016 | Ioffe | G06F 9/3893 |
| 9,766,888 B2 | 9/2017 | Gueron et al. | |
| 10,579,332 B1 | 3/2020 | Jacobi et al. | |
| 10,691,412 B2 | 6/2020 | Jocobi et al. | |
| 10,929,133 B2 * | 2/2021 | Plotnikov | G06F 9/3016 |
| 2009/0259822 A1 | 10/2009 | Platt et al. | |
| 2016/0283549 A1 | 9/2016 | Hux | |
| 2017/0336995 A1 * | 11/2017 | Nicol | G06F 11/302 |
| 2019/0138494 A1 * | 5/2019 | Inoue | G06F 9/30021 |
| 2019/0347071 A1 * | 11/2019 | Mackinnon, Jr. | G06F 9/52 |
| 2020/0019374 A1 * | 1/2020 | Prathapan | G06F 5/065 |
| 2020/0372099 A1 * | 11/2020 | Anderson | G06F 9/3851 |
| 2021/0012829 A1 | 1/2021 | Wheeler | |

FOREIGN PATENT DOCUMENTS

| | | | | |
|---|---|---|---|---|
| CN | 108733352 A | | 11/2018 | |
| JP | 2015191659 A | * | 11/2015 | G06F 7/24 |
| WO | 2021/067333 A1 | | 4/2021 | |

* cited by examiner

*Primary Examiner* — Eric Coleman
(74) *Attorney, Agent, or Firm* — Kilpatrick Townsend & Stockton LLP

(57) ABSTRACT

Vector sort circuits that can be used to accelerate sorting operations in a vector processor. When a new data element is received, the vector sort circuit can read multiple existing data elements from a vector-sort database in parallel, compare metrics of the existing data elements to a metric of the new data element, and output updated data elements to the vector-sort database based on the metrics. Depending on implementation, the vector-sort database can be maintained in sorted order, or the data elements can have assigned ranks indicating the sort order and the elements need not be stored in sorted order. A vector sort circuit can be incorporated into a vector sort functional unit of a microprocessor, and the instruction set of the microprocessor can include instructions that are executed by the vector sort functional unit using the vector sort circuit.

20 Claims, 15 Drawing Sheets

CIRCUITS AND METHODS FOR VECTOR SORTING IN A MICROPROCESSOR

BACKGROUND

This disclosure relates generally to vector microprocessors and in particular to a vector sort instruction and associated circuits for implementing sorting operations on data sets.

A common task in digital signal processing and other data processing is sorting of a list of data elements. For example, it may be desirable to sort a set of data elements according to some metric to select a subset of elements having the highest metrics (which can be, e.g., largest or smallest numeric values, depending on how the metric and the sort operation are defined).

One approach to sorting that is particularly useful for data elements received sequentially is an insertion sort algorithm. In one type of insertion sort algorithm, a sorted list of elements is maintained, with the data elements stored in order from highest metric at the top of the list to lowest metric at the bottom of the list. The list can have some maximum number (D) of data elements. When a new element is received, the new element is compared to each existing element of the sorted list, starting from the top, until the insertion location is found. At the insertion location, the new element is inserted, and each subsequent existing element is shifted one position down in the list. In a vector processor with L lanes, using a standard RISC-V vector instruction set, sorting in this manner can be implemented using an algorithm that consumes 3D/L cycles for each inserted element, so that the total sort time for N elements would be 3D*N/L. An alternative approach to insertion sort uses an unsorted list of length D. To insert a new element, the smallest element in the unsorted list can be found and replaced by the new element. In a vector processor with L lanes, using a standard RISC-V vector instruction set, sorting in this manner can be implemented using an algorithm that consumes 2D/L cycles for each inserted element, so that the total sort time for N elements would be 2D*N/L. Additional cycles would be needed to sort the D-element list after all elements have been processed.

SUMMARY

Certain embodiments described herein relate to circuits that can be used to accelerate sorting operations in a vector processor. In some embodiments, the data elements being sorted can be stored in a vector-sort database that can store at least a metric for each element, where the sort is performed according to the metric using a vector sort circuit. When a new data element is received, the vector sort circuit can read a plurality of existing data elements from the vector-sort database in parallel, compare, in parallel, a metric of each existing data element to a metric of the new data element, and output updated data elements to the vector-sort database based on the metrics. In some embodiments, the database can be maintained in sorted order. In other embodiments, the data elements can have assigned ranks indicating the sort order and the elements need not be stored in sorted order. In some embodiments, a vector sort circuit can be incorporated into a vector sort functional unit of a microprocessor, and the instruction set of the microprocessor can include instructions that are executed by the vector sort functional unit using the vector sort circuit.

Some embodiments relate to a vector sort circuit that can include a number (L) of existing-element input paths, where L is greater than 1; a new element input path; a set of L output registers; and a chain of L compare-and-exchange circuits including a first compare-and-exchange circuit and a last compare-and-exchange circuit. The existing-element input paths can be configured to receive a respective one of a plurality of existing data elements from a vector-sort database, where the received existing data element includes a metric. The new-element input path can be configured to receive a new data element that also includes a metric. The compare-and-exchange circuits can be coupled to a corresponding one of the L existing-element input paths and to the new-element input path. High output paths of the compare-and-exchange circuits can be coupled to a corresponding one of the L output registers, and low output paths of the compare-and-exchange circuits except the last compare-and-exchange circuit can be coupled to a next one of the compare-and-exchange circuits. The chain of L compare-and-exchange circuits can be configured such that the set of L output registers receives a sorted set of output data elements including the new data element and at least some of the existing data elements, where the output data elements are sorted according to the metrics of the existing data elements and the new data element.

In some embodiments, the first compare-and-exchange circuit can include a comparator, a first multiplexer, and a second multiplexer. The comparator can be configured to receive the metric of a first one of the existing data elements via a first one of the L existing-element input paths and the metric of the new data element via the new-element input path and to generate an output signal indicating whether the metric of the first one of the existing data elements is higher or lower than the metric of the new data element. The first multiplexer can have a first input coupled to the new-element input path, a second input coupled to the first one of the L existing-element input paths, an output coupled to the low output path of the first compare-and-exchange circuit, and a control input configured to receive the output signal from the comparator. The second multiplexer can have a first input coupled to the first one of the L existing-element input paths, a second input coupled to the new-element input path, an output coupled to the high output path of the first compare-and-exchange circuit, and a control input configured to receive the output signal from the comparator. In some embodiments, when the metric of the first one of the existing data elements is higher than the metric of the new data element, the first multiplexer outputs the first one of the existing data elements and the second multiplexer outputs the new data element and, when the metric of the first one of the existing data elements is lower than the metric of the new data element, the second multiplexer outputs the first one of the existing data elements and the first multiplexer outputs the new data element.

In some embodiments, the compare-and-exchange circuits other than the first compare-and-exchange circuit include a comparator, a first multiplexer, and a second multiplexer. The comparator can be configured to receive the metric of a corresponding one of the existing data elements via the corresponding one of the L existing-element input paths and the metric of the new data element via the new-element input path and to generate an output signal indicating whether the metric of the corresponding one of the existing data elements is higher or lower than the metric of the new data element. The first multiplexer can have a first input coupled to the new-element input path, a second input coupled to the corresponding one of the L existing-element input paths, an output coupled to the low output path of the respective one of the compare-and-exchange circuits, and a control input configured to receive the output signal from the comparator. The second multiplexer can have a first input coupled to the corresponding one of the L input paths, a second input coupled to the low output path of a preceding one of the compare-and-exchange circuits, an output coupled to the high output path of the respective one of the compare-and-exchange circuits, and a control input configured to receive the output signal from the comparator. In some embodiments, when the metric of the corresponding one of the existing data elements is higher than the metric of the new data element, the first multiplexer outputs the corresponding one of the existing data elements and the second multiplexer outputs the new data element and, when the metric of the corresponding one of the existing data elements is lower than the metric of the new data element, the first multiplexer outputs the corresponding one of the existing data elements and the second multiplexer outputs a data element received via the low output path of the preceding one of the compare-and-exchange circuits.

In some embodiments, the number (D) of entries in the vector-sort database can exceed the number L of existing-element input paths. The vector sort circuit can include a recirculation register coupled to the low output path of the last compare-and-exchange circuit; counter logic configured to execute a plurality of iterations of the vector sort circuit and to select a different set of L existing data elements from the vector-sort database during each iteration; and a recirculation multiplexer having an output coupled to the new-element input path, wherein the recirculation multiplexer is configured to output a newly received data element onto the new-element input path during a first iteration and to output a recirculation value from the recirculation register during each iteration other than the first iteration.

Some embodiments relate to a vector sort circuit that can include at least two element registers, at least two rank registers, a new element input path, and update logic. The element registers can be configured to store respective ones of a set of existing data elements, where the existing data elements include respective metrics. The rank registers can be associated with a corresponding one of the element registers, and the rank register can be configured to store a rank associated with the existing data element in the corresponding one of the element registers, where the existing data elements can have different ranks from a highest rank to a lowest rank. A new-element input path can be configured to receive a new data element that also includes a metric. The update logic can be coupled to the new-element input path, the element registers and the rank registers and can be configured to determine a rank of the new data element based on the metrics of the existing data elements and the new data element; to identify which one of the rank registers is storing the lowest rank; to replace the existing data element stored in the element register corresponding to the rank register storing the lowest rank with the new data element and replace the rank stored in the rank register storing the lowest rank with the rank of the new data element; and to update the rank to a next lower rank for each rank register having a rank equal to or lower than the rank of the new data element. The update logic can be configured to operate in parallel on a number (L) of the element registers and the number L of the rank registers, where the number L is at least two.

In some embodiments, the update logic can include two or more metric comparators associated with corresponding ones of the element registers, the metric comparators being configured to receive the metric of the existing data element from the corresponding one of the element registers and the metric of the new data element and to generate an output signal indicating whether the metric of the corresponding one of the existing data elements is higher or lower than the metric of the new data element. In some embodiments, the update logic can also include two or more rank comparators associated with corresponding ones of the rank registers and configured to generate an output signal indicating whether the rank stored in the corresponding one of the rank registers is the lowest rank. In some embodiments, the update logic can also include two or more element multiplexers associated with corresponding ones of the element registers and having a first input coupled to the new-element input path, a second input coupled to the corresponding one of the element registers, and an output coupled to the corresponding one of the element registers. The element multiplexers can be configured to output the new data element in the event that: (i) the output signal of the corresponding one of the metric comparators indicates that the metric of the corresponding one of the existing data elements is lower than the metric of the new data element; and (ii) the output signal of the corresponding one of the rank comparators indicates that the rank stored in the corresponding one of the rank registers is the lowest rank; and otherwise to output the existing data element.

In some embodiments, the update logic can also include a summation circuit configured to determine and output the rank of the new data element based on the output signals from the metric comparators. In some embodiments, the update logic can also include two or more incrementor circuits having a first input coupled to a corresponding one of the rank registers, a second input coupled to the output signal of the corresponding one of the metric comparators, and an output. The incrementor circuits can be configured to output an updated rank that is equal to the rank stored in the corresponding one of the rank registers in the event that the existing data element in the corresponding one of the element registers has a higher metric than the new data element and the updated rank is one rank lower than the rank stored in the corresponding one of the rank registers in the event that the existing data element in the corresponding one of the element registers has a lower metric than the new data element. In some embodiments, the update logic can also include two or more rank multiplexers having a first input coupled to the output of a corresponding one of the incrementor circuits, a second input coupled to an output of the summation circuit, and an output coupled to the corresponding one of the rank registers. The rank multiplexers can be configured to output the rank of the new data element from the output of the summation circuit when: (i) the metric of the corresponding one of the existing data elements is lower than the metric of the new data element; and (ii) the rank stored in the corresponding one of the rank registers is the lowest rank; and otherwise to output the updated rank from the corresponding one of the incrementor circuits.

In some embodiments, there can be a number (D) of element registers and the same number (D) of rank registers, where the number D is greater than the number L. The update logic can be configured to execute a plurality of iterations to operate on different subsets of L the element registers and L of the rank registers.

Some embodiments relate to a microprocessor that includes a memory circuit and a vector sort functional unit. The memory circuit can be configured to store a vector-sort database having a number of data elements, where the data elements include respective metrics. The vector sort functional unit can be coupled to the memory circuit and configured to execute a vector sort initialization instruction and a vector sort instruction. Executing the vector sort initialization instruction can initializing the vector-sort database to an empty state. Executing the vector sort instruction can include operating a vector sort circuit to read a number (L) of existing data elements in parallel from the vector-sort database, compare, in parallel, a metric of each of the L existing data element to a metric of a new data element, and output a number L of updated data elements to the vector-sort database based on the metrics. In some embodiments, the vector sort circuit can be configured to move data elements within the vector-sort database such that the data elements in the vector-sort database are stored in a sorted order.

In some embodiments, the data elements in the vector-sort database can include respective ranks, and the vector sort circuit can be further configured to update the ranks of the data elements in the vector-sort database to represent a sorted order. In some embodiments, the vector sort circuit can be further configured to identify the data element in the vector database having a lowest rank and to replace the data element having the lowest rank with a new data element in the event that the metric of the new data element is higher than the metric of at least one of the existing data elements.

In some embodiments, the vector sort circuit is configured to receive two or more new data elements in parallel, where the new data elements include respective metrics, and to sort the new data elements into the vector-sort database in a single operation. In some embodiments, the vector sort circuit can include two or more cascaded sub-circuits that have: L existing-element input paths; a new-element input path; a set of L output registers; and a chain of L compare-and-exchange circuits including a first compare-and-exchange circuit and a last compare-and-exchange circuit. The existing-element input paths can be configured to receive a respective one of L existing data elements, where a first one of the cascaded sub-circuits is configured to read L existing data elements in parallel from the vector-sort database. The new-element input paths in different sub-circuits can be configured to receive different ones of the new data elements. Compare-and-exchange circuits in the chain of compare-and-exchange circuits can be coupled to a corresponding one of the existing-element input paths and to the new-element input path and can have a high output path coupled to a corresponding one of the L output registers and a low output path that, except in the last compare-and-exchange circuit, is coupled to a next one of the compare-and-exchange circuits. The chain of L compare-and-exchange circuits can be configured such that the set of L output registers receives a sorted set of output data elements including the new data element and at least some of the existing data elements, where the output data elements are sorted according to the metrics of the existing data elements and the new data element. The L output registers of a last sub-circuit of the plurality of cascaded sub-circuits are configured to write the sorted set of output data elements to the vector-sort database. The L output registers of the cascaded sub-circuits other than the last sub-circuit can be coupled to the L existing-element input paths of a next one of the cascaded sub-circuits.

The following detailed description, together with the accompanying drawings, will provide a better understanding of the nature and advantages of the claimed subject matter.

DETAILED DESCRIPTION

The following description of exemplary embodiments is presented for the purpose of illustration and description. It is not intended to be exhaustive or to limit the claimed embodiments to the precise form described, and persons skilled in the art will appreciate that many modifications and variations are possible. The embodiments have been chosen and described in order to best explain their principles and practical applications to thereby enable others skilled in the art to best make and use various embodiments and with various modifications as are suited to the particular use contemplated.

Figure 1:
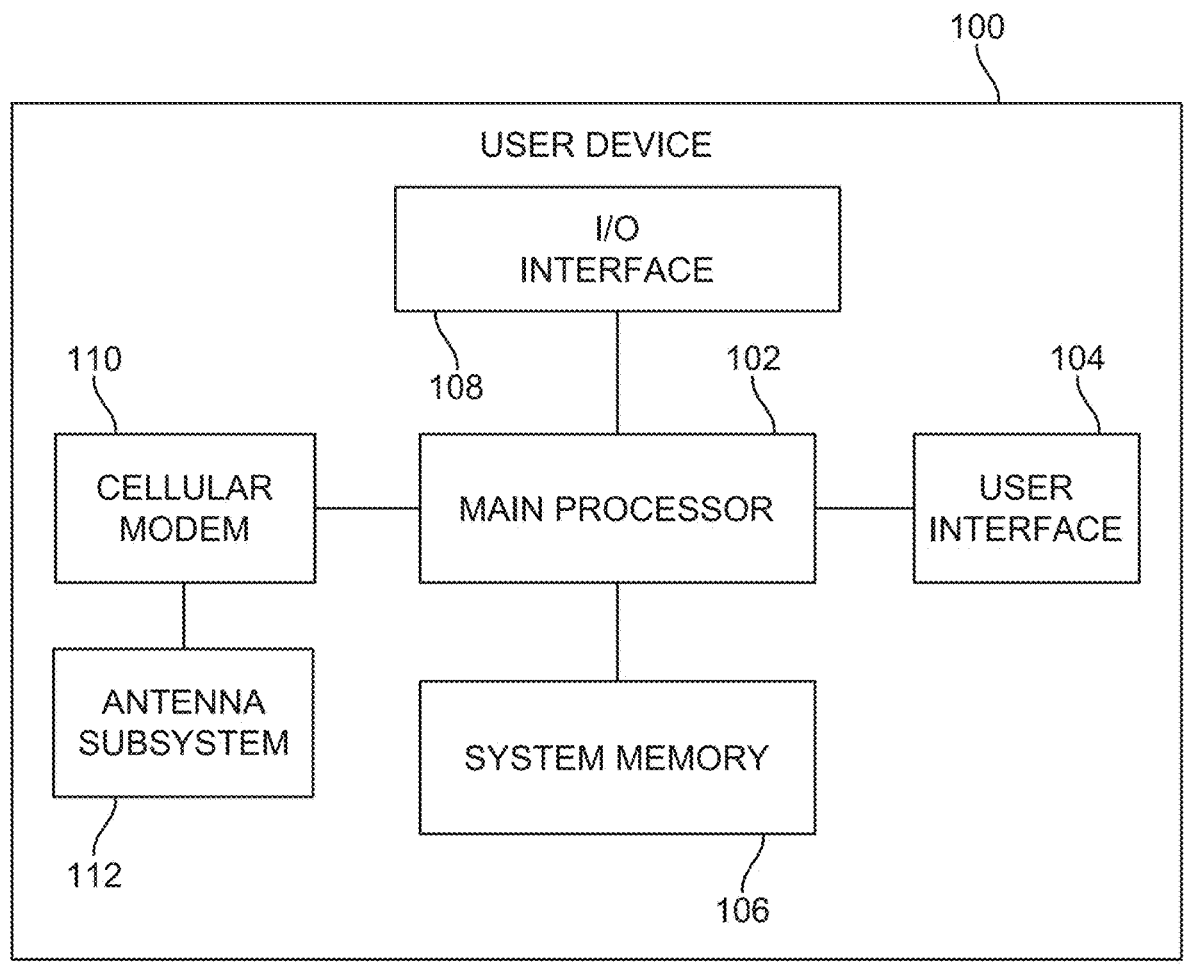
FIG. 1 is a simplified block diagram of a user device according to some embodiments.

FIG. 1 is a simplified block diagram of a user device 100 according to some embodiments. User device 100 can be, for example, a mobile device such as a smartphone, tablet computer, laptop computer, wearable device, or any other electronic device capable of operating as user equipment (UE) in a cellular radio area network. User device 100 is representative of a broad class of user-operable devices that may incorporate a cellular modem as described herein, and such devices can vary widely in capability, complexity, and form factor.

Main processor 102 can include, e.g., one or more single-core or multi-core microprocessors and/or microcontrollers executing program code to perform various functions associated with user device 100. For example, main processor 102 can execute an operating system and one or more application programs compatible with the operating system. In some instances, the program code may include instructions to send information to and/or receive information from other devices or systems, e.g., via a cellular data network such as a 4G or 5G network.

User interface 104 can include user-operable input components such as a touch pad, touch screen, scroll wheel, click wheel, dial, button, switch, keypad, keyboard, microphone, or the like, as well as output components such as a video screen, indicator lights, speakers, headphone jacks, haptic motors, or the like, together with supporting electronics (e.g., digital-to-analog or analog-to-digital converters, signal processors, or the like). Depending on the implementation of a particular user device 100, a user can operate input components of user interface 104 to invoke functionality of user device 100 and/or receive output from user device 100 via output components of user interface 104. In some embodiments, user device 100 may have a limited user interface (e.g., a small number of indicator lights and/or buttons) or no user interface.

System memory 106 can incorporate any type and combination of data storage media, including but not limited to random-access memory (e.g., DRAM, SRAM), flash memory, magnetic disk, optical storage media, or any other non-transitory storage medium, or a combination of media, and can include volatile and/or non-volatile media. System memory 106 can be used to store program code to be executed by main processor 102 and any other data or instructions that may be generated and/or used in the operation of user device 100.

Input/output (I/O) interface 108 can include hardware components and supporting software configured to allow user device 100 to communicate with other devices via point-to-point or local area network links. In some embodiments, I/O interface 108 can support short-range wireless communication (e.g., via Wi-Fi, Bluetooth, or other wireless transports) and can include appropriate transceiver and signal processing circuitry and software or firmware to control operation of the circuitry. Additionally or instead, in some embodiments, I/O interface 108 can support a wired connection to another device.

To enable communication via cellular networks, including cellular data communication, user device 100 can include a cellular modem 110 coupled to an antenna subsystem 112. Cellular modem 110 can be implemented as a microprocessor or microcontroller that acts as a co-processor to main processor 102. In some embodiments, cellular modem 110 and main processor 102 can be implemented as integrated circuits fabricated on a common substrate, e.g., as part of a system-on-a-chip design. In some embodiments, cellular modem 110 can support cellular data communication according to standards promulgated by the 3rd Generation Partnership Project (3GPP) to enable radio-frequency communication between a base station (typically implemented at a cellular antenna tower) and various user equipment ("UE"), which can include user device 100, via an "uplink" from the UE to the base station and a "downlink" from the base station to the UE. Standards promulgated by 3GPP include specifications for radio access networks (RANs), such as 4G Long-Term Evolution (referred to herein as "4G" or "LTE") and 5G New Radio (referred to herein as "5G" or "NR"). The 4G and 5G RAN specifications define multiple logical channels between the base station and the UE, including a physical uplink shared channel (PUSCH) and physical downlink shared channel (PDSCH) that transmit application-layer data, as well as a physical uplink control channel (PUCCH) and physical downlink control channel (PDCCH) that transmit control data used to specify various parameters associated with data transmission on the shared channels. At a high level, for any of these channels, data to be transmitted is encoded in the frequency domain, then transformed to time domain using an inverse Fast Fourier Transform (IFFT) for transmission on the radio channel; the receiver reverses the process by performing an FFT on the received time-domain signal, then decoding the data in the frequency domain. The particular encoding and decoding operations may differ from channel to channel and between 4G and 5G. Processing of digital signals can include sorting data samples according to some metric. For example, at different stages of processing, data samples may be sorted according to signal strength, log likelihood ratios, or other metrics.

Antenna subsystem 112 can include an antenna, which can be implemented using a wire, metal traces, or any other structure capable of radiating radio-frequency (RF) electromagnetic fields and responding to RF electromagnetic fields at frequencies used in cellular data communication. For instance, 4G and 5G networks currently use various spectrum bands, including bands at 700 MHz, 850 MHz, 900 MHz, 1.5 GHz, 1.8 GHz, 2.1 GHz, 2.5 GHz and 3.5 GHz. Antenna subsystem 112 can also include circuitry to drive the antenna and circuitry to generate digital signals in response to received RF signals. A particular antenna implementation is not critical to understanding the present disclosure, and those skilled in the art will know of numerous implementations. In some embodiments, antenna subsystem 112 can be shared between cellular modem 110 and I/O interface 108; for instance, the same antenna can be used to support any combination of cellular, Wi-Fi, and/or Bluetooth communications.

User device 100 can also include other components not shown in FIG. 1. For example, in various embodiments, user device 100 can include one or more data storage devices using fixed or removable storage media; a global positioning system (GPS) and/or other global navigation satellite system (GNSS) receiver; a camera; a microphone; a speaker; a power supply (e.g., a battery); power management circuitry; any number of environmental sensors (e.g., temperature sensor, pressure sensor, accelerometer, chemical sensor, optical sensor, etc.); and so on. Accordingly, user device 100 can provide a variety of functions, some or all of which may be enhanced by or reliant on cellular data communication supported by cellular modem 110.

Figure 2:
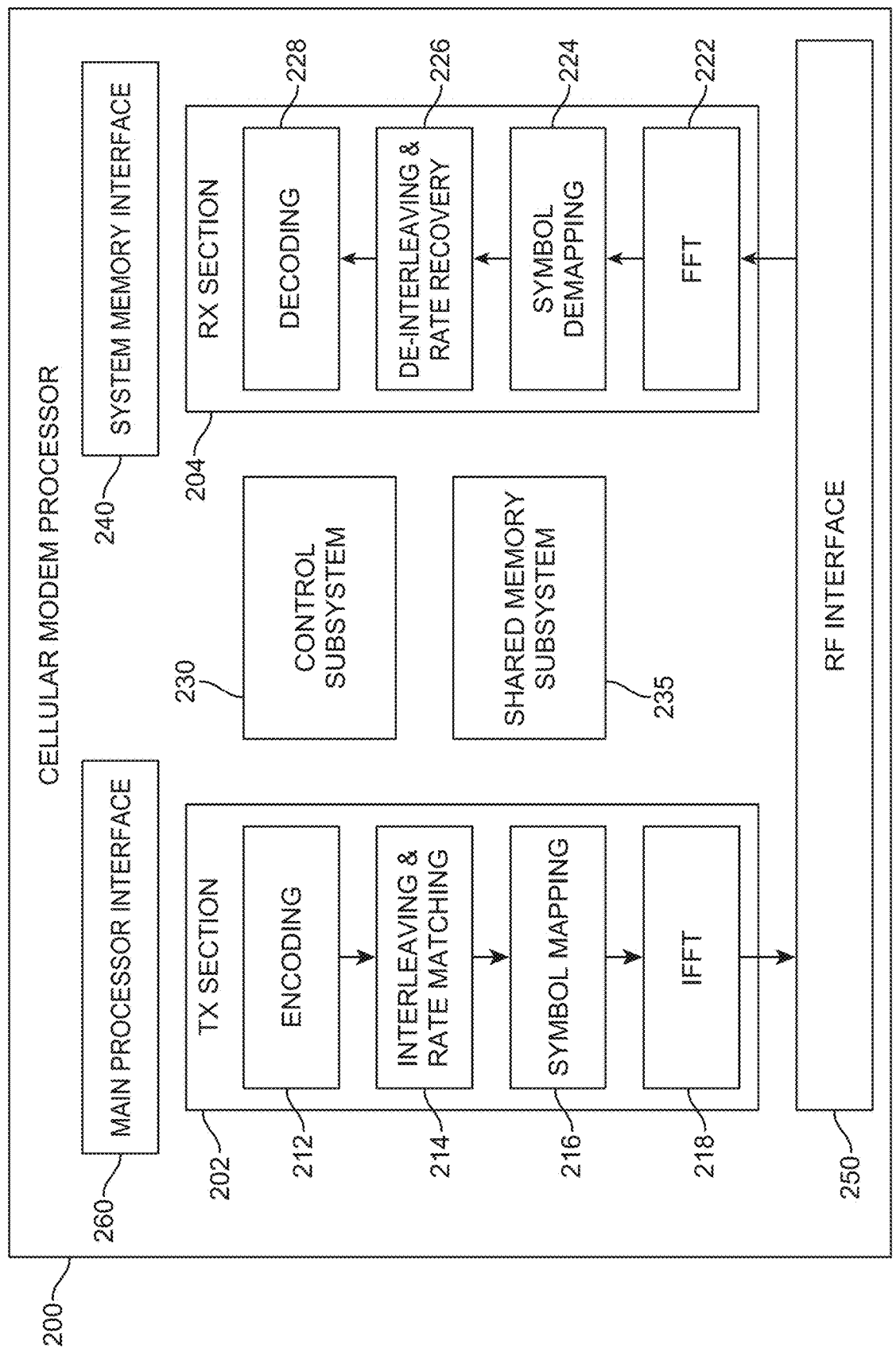
FIG. 2 is a simplified block diagram of a cellular modem processor according to some embodiments.

FIG. 2 is a simplified block diagram of a cellular modem processor 200 according to some embodiments. Cellular modem processor 200 can implement all or part of cellular modem 110 of FIG. 1. In various embodiments, cellular modem processor 200 can operate as user equipment (UE) in a cellular radio access network such as a 4G network and/or a 5G network.

Cellular modem processor 200 can include a transmit (TX) section 202 and a receive (RX) section 204. TX section 202 can include one or more data processing pipelines to prepare data for transmission via antenna subsystem 110, and RX section 204 can include one or more data processing pipelines to reconstruct transmitted data from signals received via antenna subsystem 110. Cellular modem processor 200 can also include a control subsystem 230, a shared memory subsystem 235 and various interfaces to other system components, such as a system memory interface 240, an RF interface 250, and a main processor interface 260.

Data processing pipelines in TX section 202 and RX section 204 can include logic circuitry (e.g., any combination of fixed-function and/or programmable circuitry) that implements a specific sequence of operations and associated storage circuitry (e.g., registers, data buffers, and/or other memory circuits) to store data being operated on. The operations can conform to the specifications of a particular cellular data network, including 4G and/or 5G networks. For example, shown in TX section 202 are an encoding unit 212, an interleaving and rate-matching unit 214, a symbol mapping unit 216, and an inverse Fast Fourier Transform (IFFT) unit 218. Encoding unit 212 can perform code block segmentation and channel coding for a particular channel (e.g., for PUCCH or PUSCH). The encoding operations can be specific to a particular channel and/or a particular communication standard. For instance, 4G PUSCH channel coding operations can include CRC (cyclic redundancy check) calculation and Turbo coding; 4G PUCCH channel coding operations can include CRC calculation and convolutional coding; 5G PUSCH channel coding operations can include CRC calculation and low-density parity check (LDPC) coding; and 5G PUCCH channel coding operations can include CRC calculation and polar coding. Interleaving and rate-matching unit 214 can perform interleaving and rate matching operations on encoded code blocks. As with encoding operations, interleaving and rate matching operations can depend on the particular channel and/or particular communication standard. For instance, in 4G PUSCH, interleaving precedes rate matching, while 5G PUSCH reverses the order. Symbol mapping unit 216 can receive bit sequences for code blocks after encoding, rate-matching and interleaving and can map the bit sequences onto symbols in an appropriate constellation for each of a set of orthogonal frequency division multiplexing (OFDM) subcarriers. Again, the mapping can depend on the particular channel and/or communication standard. Due to such differences, dedicated hardware pipelines can be constructed to support different physical channels (e.g., PUSCH vs. PUCCH) and/or different communication standards (e.g., 4G vs. 5G), or multipurpose pipelines that share hardware can be constructed. IFFT unit 218 receives the symbols from symbol mapping unit 216. Each symbol can be, e.g., a complex number representing an amplitude and phase. IFFT unit 218 can perform an IFFT to transform the symbols to a sample sequence in the time domain. This sample sequence can be provided to RF interface 250.

RF interface 250 can be an interface to antenna subsystem 112 of FIG. 1 and can convert the sample sequence to an analog signal that is mixed onto the carrier frequency and transmitted via an antenna. RF interface 250 can also down-convert received RF signals to baseband and convert the baseband analog signal to a sequence of digital samples. Digital sample sequences can be provided to pipelines in RX section 204.

As with TX section 202, operations in RX section 204 can conform to the specifications of a particular cellular data network, including 4G and/or 5G networks. For example, shown in RX section 204 are a Fast Fourier Transform (FFT) unit 222, a symbol demapping unit 224, a de-interleaving and rate recovery unit 226, and a decoding unit 228. FFT unit 222 can receive, via RF interface 250, a sequence of samples representing a received (baseband) signal and can perform an FFT to transform the samples from time domain to frequency domain. Symbol demapping unit 224 can perform demapping and symbol-decoding operations to generate a representation of the bits that were transmitted. The decoding operation can be a soft decoding operation that produces log likelihood ratios (LLRs) or other estimates of the relative probability of a given bit being 0 or 1. De-interleaving and rate recovery unit 226 can reverse the interleaving and rate matching operations that were performed at the transmitter. Decoding unit 228 can perform channel decoding to decode the code blocks and recover the data. As with corresponding components in TX section 204, the operations implemented in demapping unit 224, de-interleaving and rate recovery unit 226, and decoding unit 228 can be specific to a particular channel and/or a particular communication standard. Due to such differences, dedicated hardware pipelines can be constructed to support different physical channels (e.g., PDSCH vs. PDCCH) and/or different communication standards (e.g., 4G vs. 5G), or multi-purpose pipelines that share hardware can be constructed.

Operation of the pipelines in TX section 202 and RX section 204 can be coordinated by control subsystem 230. Control subsystem 230 can include circuitry to manage communication between units in TX section 202 and RX section 204 and other components of cellular modem processor 200 (e.g., RF interface 250, main processor interface 260, and system memory interface 240) and/or between cellular modem processor 200 and other components of a device or system (e.g., user device 100 of FIG. 1) in which cellular modem processor 200 operates. A variety of implementations can be used, including various combinations of fixed-function circuitry and programmable circuitry executing program code provided as firmware. Shared memory subsystem 235 can include memory circuits (e.g., SRAM, DRAM, or the like), a read interface and a write interface connected via crossbars to TX section 202 and RX section 204 (or to individual units in TX section 202 and/or RX section 204), and arbitration logic to manage multiple requests (e.g., using time division multiplexing or other techniques). In some embodiments, shared memory subsystem 235 can be implemented such that any unit in TX section 202 or RX section 204 can access any location in the shared memory. A variety of architectures, including conventional architectures, can be used. In some embodiments, shared memory subsystem 235 can be used to transfer data into and out of TX section 202 and/or RX section 204, or between units within TX section 202 and/or RX section 204.

Main processor interface 260 can enable communicating with main processor 102 (shown in FIG. 1), via an interface such as Advanced eXtensible Interface (AXI), which is part of ARM Advanced Microcontroller Bus Architecture, or any other suitable interface for communication between a main processor and a coprocessor. Other interfaces to other components of user device 100 can also be provided, such as a system memory interface 240 that provides a direct memory access (DMA) interface to transfer data between shared memory subsystem 235 and system memory 106 of FIG. 1.

It will be appreciated that cellular modem processor 200 is illustrative and that variations and modifications are possible. A cellular modem processor can include any number and combination of pipelines, supporting any number and combination of cellular data communication standards. Control subsystems, memory subsystems and interfaces to other components can be varied as desired. In some embodiments, cellular modem processor 200 can have a high throughput to support high-speed cellular networks (e.g., 12 Gbps for a 5G network).

In some embodiments, some or all of the data processing pipelines (e.g., pipelines in TX section 202 and/or RX section 204, as well as any other pipelines in cellular modem processor 200) can be single-instruction, multiple-data (SIMD) pipelines (also referred to as vector pipelines), which can increase throughput by processing data in a number (L) of parallel lanes. Pipelines can perform various digital signal processing operations, which can include sorting of a list of data elements. For example, it may be desirable to sort a set of data elements according to some metric to select a subset of elements having the highest metrics (which can be, e.g., largest or smallest numeric values, depending on how the metric and the sort operation are defined). The original set of data elements can include a number (N) of elements, and the selected subset can include a number (D) of elements. In some examples described herein, it is assumed that N>D and that it suffices to keep track of D elements; however, those skilled in the art with access to this disclosure will appreciate that a case where D=N is not precluded.

Certain embodiments relate to vector sort circuits that can be used to accelerate insertion sort in a vector processor. For purposes of the present description, it is assumed that the vector sort circuit is coupled to a vector-sort database that stores sorted elements (also referred to as "data elements"). The vector-sort database can be implemented using a register file, buffer, or any other memory circuit or memory structure that is readable and writeable. For each data element, the vector-sort database can store a metric, which can be a quantity or attribute according to which the data elements are being sorted. A variety of metrics can be used, provided that the metric has a set of different possible values and that those different possible values can be ordered from "highest" to "lowest." In some embodiments, the metric can have a numerical value, and the ordering can be based on comparing numerical values. The sort order of a numerical metric can run in either direction. For instance, in a descending sort (9, 8, 7, 6, . . . ), a "higher" metric would refer to a numeric value greater than the numeric value of a "lower" metric, while in an ascending sort (1, 2, 3, 4, . . . ), a "higher" metric would refer to a numeric value less than the numeric value of a "lower" metric. It will be appreciated that a variety of properties can be defined as a metric. While comparing numerical values can facilitate implementation of sorting operations described herein, it should be understood that sorting can be implemented for any type of metric, provided that suitable logic circuits can be configured to compare two metrics and determine which is higher (or lower).

In some embodiments, the vector-sort database can store additional information about each data element in association with the metric. For instance, each data element in the data set may have a unique identifier (e.g., a timestamp), and the identifier can be stored in the database together with the metric. The identifier may or may not have additional information items associated with it in other data stores. While a unique identifier is used herein as an example, it should be understood that any type and amount of information for a data element can be stored in association with the metric in the vector-sort database.

Figure 3:
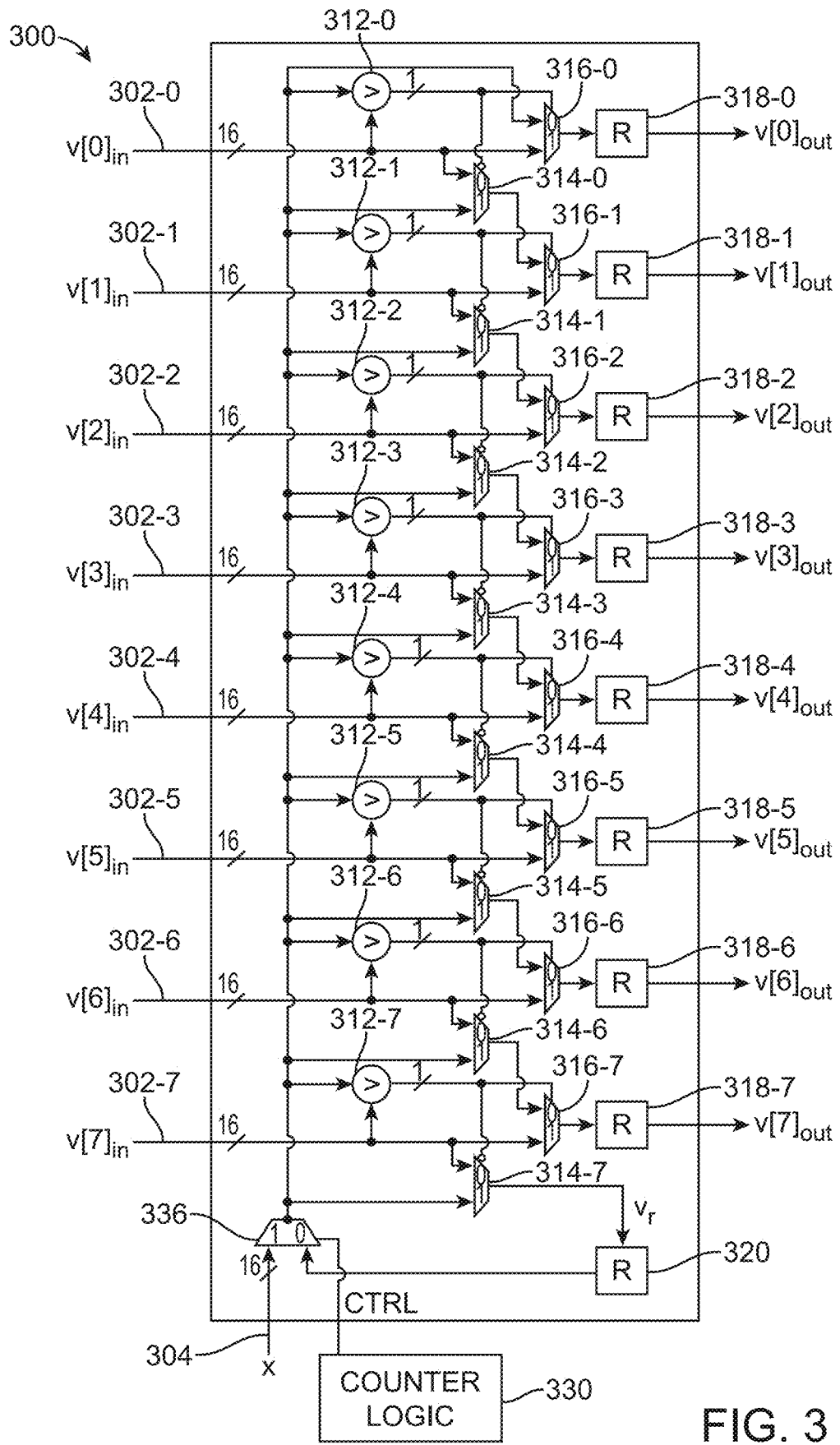
FIG. 3 shows a simplified schematic diagram of a vector sort circuit according to some embodiments.

FIG. 3 shows a simplified schematic diagram of a vector sort circuit 300 according to some embodiments. Vector sort circuit 300 can be used to insert a new element into a vector-sort database of size D that stores data elements in sorted order. Vector sort circuit 300 has a number (L) of lanes to enable multiple comparisons and element-shifting operations to be performed in parallel. In this example, vector sort circuit 300 has eight lanes, although it should be understood that the number L of lanes can be varied. In some embodiments, the number of lanes in a vector sort circuit can match the number of SIMD lanes in other functional units of a processing pipeline or other microprocessor in which the vector sort circuit is included. In this example, it is assumed that vector sort circuit 300 is coupled to a vector-sort database (not shown in FIG. 3) that stores a set of elements v[0] through v[D−1] in sorted order, with v[0] being the element with the largest metric, and so on. Thus, the vector-sort database can include D elements. In some embodiments, D can be greater than L; where this is the case, vector sort circuit 300 can be operated iteratively (as described below) to insert a new element.

Vector sort circuit 300 includes a set of L=8 input paths 302-0 through 302-7, each of which can receive an existing element v[i] (where i=0, . . . , 7 is an index indicating the location of the element in the vector-sort database) from a vector-sort database (not shown in FIG. 3). A new-element input path 304 can receive a new element x that is to be inserted into the vector-sort database. Circuit 300 can implement a chain of compare-and-exchange circuits configured to insert new element x at the location of the first existing element v[i] for which the metric of element v[i] is lower than the metric of element x and to shift that element v[i] and all subsequent elements v[i] from position i to position i+1. Each compare-and-exchange circuit can include a comparator 312-i, a first multiplexer 314-i that outputs a lower-ranked element on a "low" output path of the compare-and-exchange circuit, and a second multiplexer 316-i that outputs a higher-ranked element on a "high" output path of the compare-and-exchange circuit. The low output path of each compare-and-exchange circuit is coupled as an input to the second multiplexer 316-(i+1) of the next compare-and-exchange circuit in the chain, except for the last compare-and-exchange circuit (multiplexer 314-7).

In some embodiments, comparators 312-0 through 312-7 are each coupled to new-element input path 304 and to a respective one of the input paths 302-0 through 302-7. Thus, comparator 312-i can compare the metric of existing element v[i] and the metric of the new element x and generate a one-bit output signal. In this example, the one-bit output signal is "1" if the metric for the existing element v[i] is higher than the metric of the new element x and "0" otherwise. The output of each comparator 312-i is coupled to multiplexers 314-i and 316-i. Each multiplexer 314-i receives existing element v[i] as the first input and new element x as a second input and is configured to output the first input if the control signal is "0" and the second output if the control signal is "1." Thus, multiplexer 314-i outputs the one of existing element v[i] or new element x that has the lower metric. In the first compare-and-exchange circuit in the chain, multiplexer 316-0 receives the new element x as a first input and the existing element v[0] as a second input. In each other compare-and-exchange circuit in the chain, multiplexer 316-i (for i=1, . . . , 7) receives the output of multiplexer 314-(i−1) (i.e., the low output of the previous compare-and-exchange circuit in the chain) as a first input and the existing element v[i] as a second input. All multiplexers 316-i (for i=0, . . . , 7) are configured to output the first input if the control signal is "0" and the second output if the control signal is "1." The output of each multiplexer 316-i (for i=0, . . . , 7) is coupled to a corresponding output register 318-i. In the last compare-and-exchange circuit in the chain, the output of the second multiplexer (multiplexer 314-7) is coupled to a recirculation register 320.

In operation, the vector-sort database can be initialized so that all elements have a default metric, which can be the lowest possible metric. For instance, in a descending numerical sort where the metric has only non-negative values, the default metric can be 0. As each new element x is received, a set of elements v[0] through v[7] from the vector-sort database can be provided in parallel to input paths 302-0 through 302-7, and new element x can be provided to input path 304. Each comparator 312-i compares the metric of the existing element v[i] and the metric of the new element x. If, for a given index i, the metric of the existing element v[i] is higher than the metric of the new element x, the comparator outputs "1." In that case, the corresponding multiplexer 314-i outputs the new element x (which has the lower metric), and the corresponding multiplexer 316-i outputs the existing element v[i] (which has the higher metric). Existing element v[i] propagates to register 318-i and is written back to the same (ith) position in the vector-sort database from which it was read. In this manner, any element v[i] whose metric is higher than the metric of new element x remains in the same position in the vector-sort database.

If, for a given index i, the metric of the existing element v[i] is lower than the metric of the new element x, the comparator outputs "0." In that case, the corresponding multiplexer 314-i outputs the existing element v[i] (which has the lower metric), and the existing element is shifted down by one position. In the first compare-and-exchange circuit in the chain (i=0), if new element x has a higher metric than existing element v[0], multiplexer 316-0 outputs the new element x. Similarly, for i>0, if new element x has a higher metric than existing element v[i], the corresponding multiplexer 316-$i$ outputs the element received from multiplexer 314-($i$−1). The output of multiplexer 316-$i$ propagates to register 318-$i$ and is written back to the corresponding (ith) position in the vector sort database. In this manner, any element v[i] whose metric is lower than the metric of new element x is shifted one position in the database (from index i to index i+1), and new element x is inserted into the database in its sorted position.

Multiplexer 314-7 outputs whichever of existing element v[7] or new element x has the lower metric to recirculation register 320 as a recirculation element ($v_r$). If D is not greater than L (in this example, L=8), then element $v_r$ can be discarded, as it is not among the D elements with the highest metrics. If D is greater than L, then circuit 300 can perform another iteration to make comparisons to additional elements of the vector-sort database. For example, circuit 300 can include counter logic 330. Counter logic 330 can maintain an iteration counter that counts from k=0 to k=(D/L)−1. During iteration k, the existing elements that are input via input paths 302-$i$ can be elements v[i+k], so that for L=8, the first iteration reads and writes elements v[0] through v[7], the second iteration reads and writes elements v[8] through v[15], and so on until the last iteration reads and writes elements v[D−8] through v[D−1]. Counter logic 330 can also provide a control signal to a recirculation multiplexer 336. Recirculation multiplexer 336 can have a first input path coupled to receive the new element x and a second input path coupled to receive an element $v_r$ from recirculation register 320. For the first iteration (k=0), counter logic 330 can control multiplexer 336 to select the new element x, and for each iteration after the first (k>0), counter logic 330 can control multiplexer 336 to select element $v_r$. Thus, if an existing element is displaced from position v[7] in the first iteration, that element can become the recirculation element $v_r$. Through operation of circuit 300, $v_r$ can be inserted into position v[8] in the next iteration, and element v[15] can be displaced so that each existing element with metric lower than the metric of new element x is shifted down one position in the database. If, on the other hand, new element x has a smaller metric than any of elements v[0] through v[7], element x can become the recirculation element $v_r$ that is compared to elements v[8] through v[15], and so on. It should be noted that the number of iterations performed by circuit 300 need not depend on where element x is inserted into the vector-sort database; all elements with metric smaller than x should be shifted down. In some embodiments, the number of iterations can depend on how many elements are already present in the vector-sort database. For instance, if D is 32 and new element x is the twelfth element to be sorted into the vector-sort database, then all elements after v[12] will still be in the initial state, and it is not necessary to continue updating the vector-sort database.

Figures 4A, 4B:
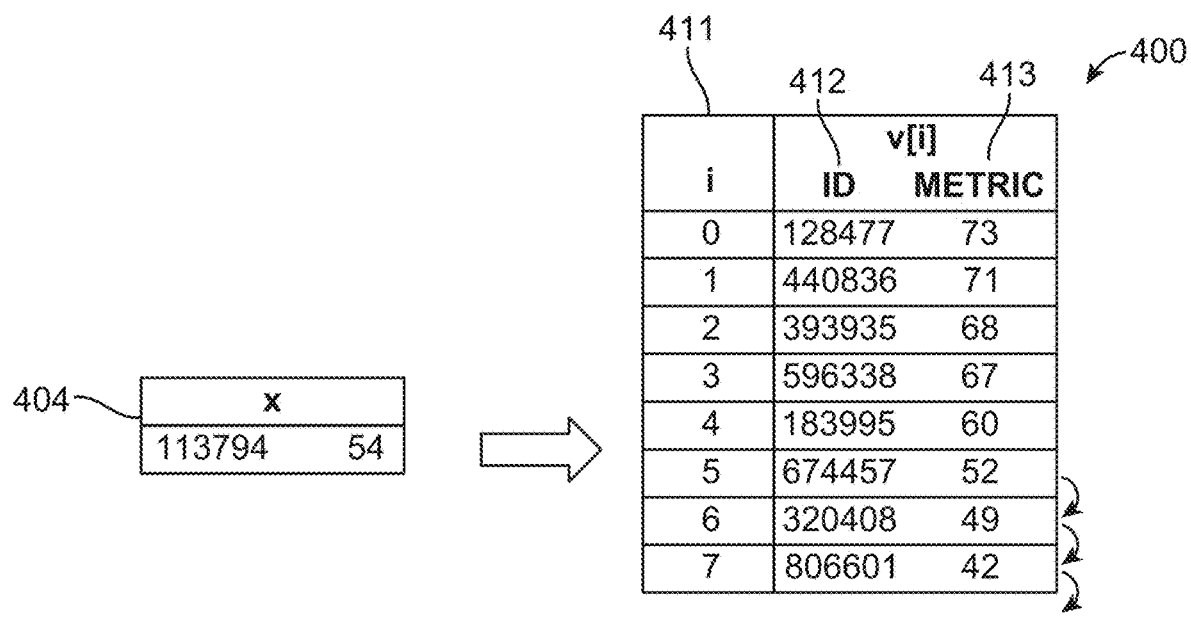
FIGS. 4A-4C illustrate a sorting operation according to some embodiments.
Figure 4C:
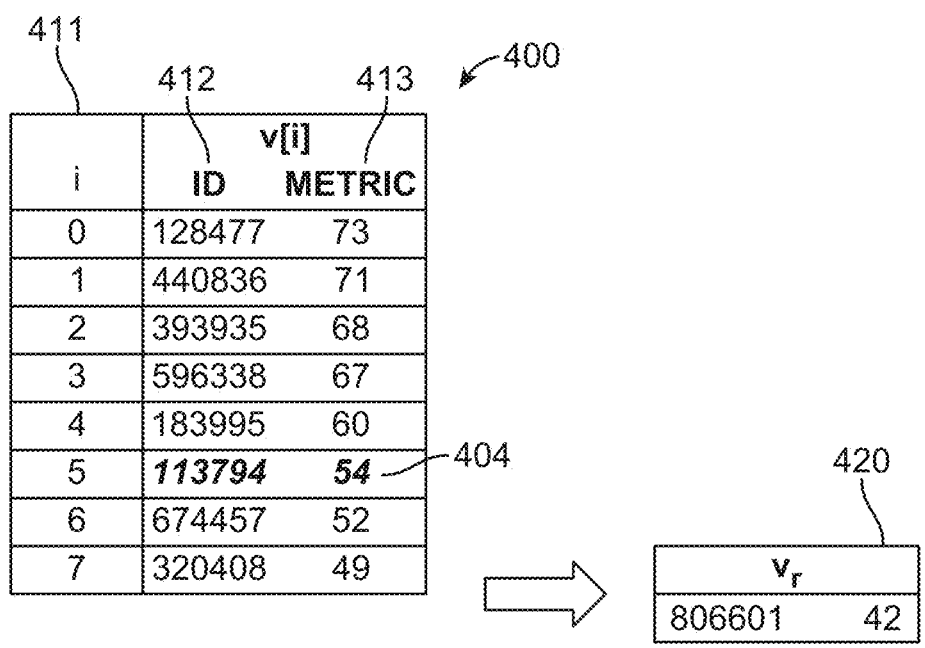

Operation of circuit 300 can be further understood with reference to FIGS. 4A-4C, which illustrate a sorting operation according to some embodiments. FIG. 4A shows a vector-sort database 400 containing 8 sorted elements (rows 402). For convenience of description, each row 402 is labeled with an index (i) from 0 to 7, as shown in column 411; in some implementations, the index is implicit in the memory location that stores each element and storing an index is optional. Each element has an identifier (ID), shown in column 412. The identifier can be, e.g., a timestamp or any other identifier that uniquely identifies each element in the data set that is being sorted. Each element also has a metric, shown in column 413. As describe above, the metric can be any data that represents an ordered set of values such that "higher" and "lower" metrics are identifiable. As shown in vector-sort database 400, the elements are sorted in order of descending numeric values of the metric: the data element with the highest metric is in row i=0, and so on.

FIG. 4B shows a new element 404 being sorted into vector-sort database 400. As shown, new element 404 should be inserted at index 5, and existing elements at index 5, 6, and 7 should be shifted down. Circuit 300 can effect this operation. For example, elements v[0] through v[7] from vector-sort database 400 can be input in parallel via data paths 302-0 through 302-7, and new element 404 can be input via data path 304. In some embodiments, both the ID and the metric of each data element can be input; however, comparators 312-0 through 312-7 can operate on just the metric of each element. In this example, comparators 312-0 through 312-4 determine that the existing element v[i] has the larger metric. Consequently, for index i=0, . . . , 4, each multiplexer 316-0 through 316-4 outputs the existing element v[i] (which can include both the ID and the metric) on the high output path to register 318-$i$. As shown in FIG. 4C, this results in elements v[0] through v[4] being written back to the same positions in database 400. Each multiplexer 314-0 through 314-4 outputs the new element x on the low output path to the next compare-and-exchange circuit in the chain.

Comparators 312-5 through 312-7 each determine that the new element x has the larger metric. Consequently, for index i=5, multiplexer 316-5 outputs the new element x received from multiplexer 314-4 on the high output path to register 318-5. As shown in FIG. 4C, this results in new element x being written into the i=5 position in database 400. In the same operation, multiplexer 314-5 outputs element v[5] on the low output path to multiplexer 316-6, which outputs element v[5] to register 318-6, while multiplexer 314-6 outputs element v[6] on the low output path to multiplexer 316-7, which outputs element v[6] to register 318-7. As shown in FIGS. 4B and 4C, this results in two elements each shifting down by one position in database 400. Multiplexer 314-7 outputs the existing element v[7] to recirculation register 320, as shown at element 420 in FIG. 4C. If vector-sort database 400 has more than eight elements, element 420 can be inserted into the next position by performing another iteration in circuit 300, as described above.

It will be appreciated that circuit 300 is illustrative and that variations and modifications are possible. For instance, while eight lanes are shown, any number of parallel lanes can be provided. Similarly, while examples herein describe sorting by descending numerical metric, a sort by ascending numerical metric can be implemented, e.g., by reversing the outputs of the comparators. In some embodiments, the comparators can be reconfigurable to perform either ascending or descending numerical sort. In instances where two metrics being compared are equal (a tie), the comparator output is a matter of design choice. In some embodiments, assigning the higher metric to the new element in the event of a tie may prevent swapping positions of elements having equal metrics at the iteration boundary.

As noted above, any type and number of data elements can be sorted using circuit 300 or similar circuits. The vector-sort database can contain any amount of information for each data element. In examples shown herein, each data element in the database has a metric and a unique identifier. It should be understood that other information pertaining to specific data elements can be stored in some other memory area in association with the identifier. If desired, all information about each data element can be included in the vector-sort database; however, this may increase the amount of data that needs to be moved as elements are sorted. In embodiments where the only desired output is a sorted list of metrics, data-element identifiers need not be maintained in the vector-sort database, and the vector-sort database can just contain the metrics.

Circuit 300 can provide substantially faster sorting performance than conventional vector processors. In some embodiments, circuit 300 can sort a new element into a vector-sort database in D/L cycles, as compared to 2D/L or 3D/L cycles for conventional vector processors.

Figure 5A:
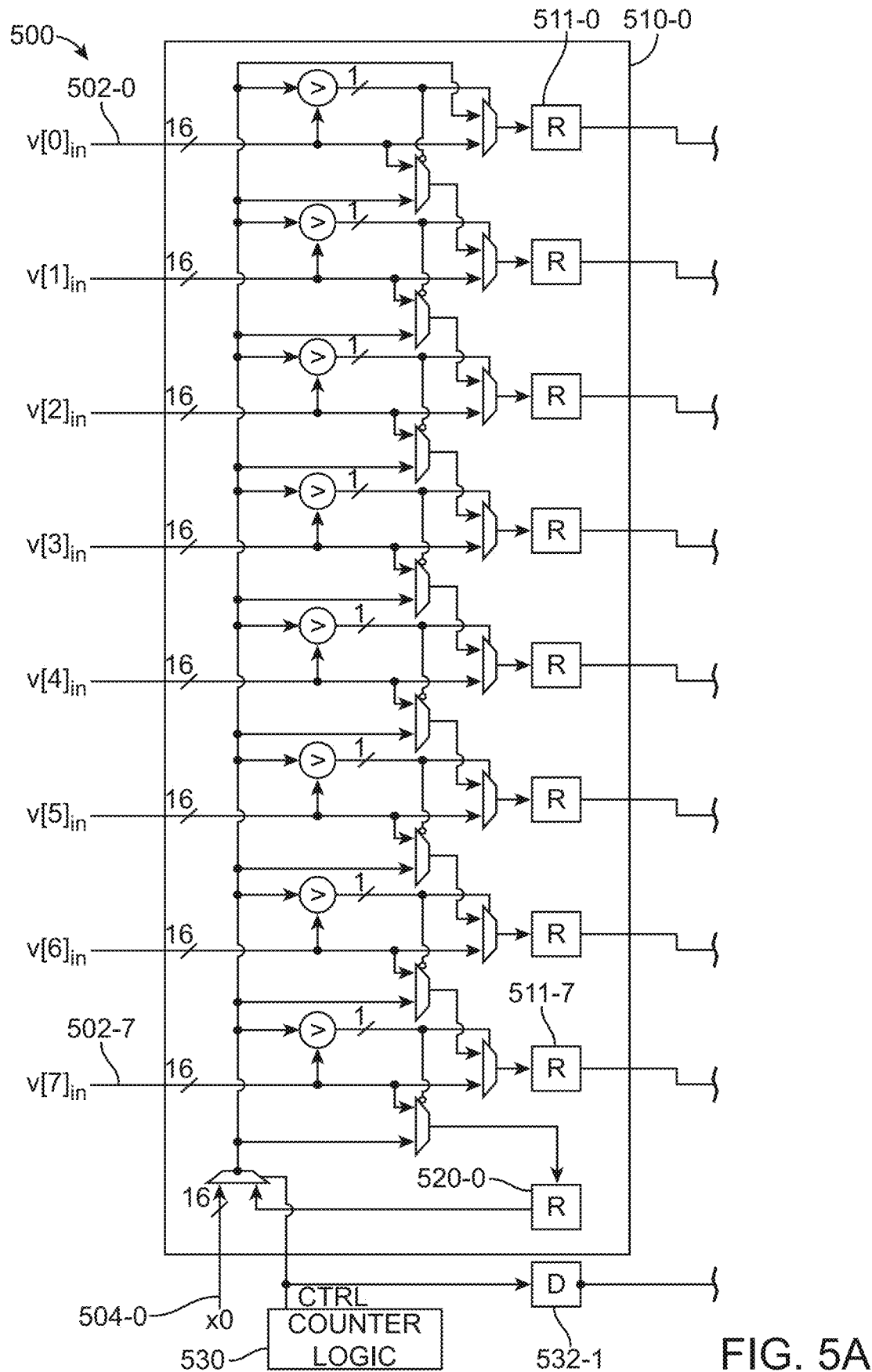
FIGS. 5A-5D together show a simplified schematic diagram of a vector sort circuit according to some embodiments.
Figure 5B:
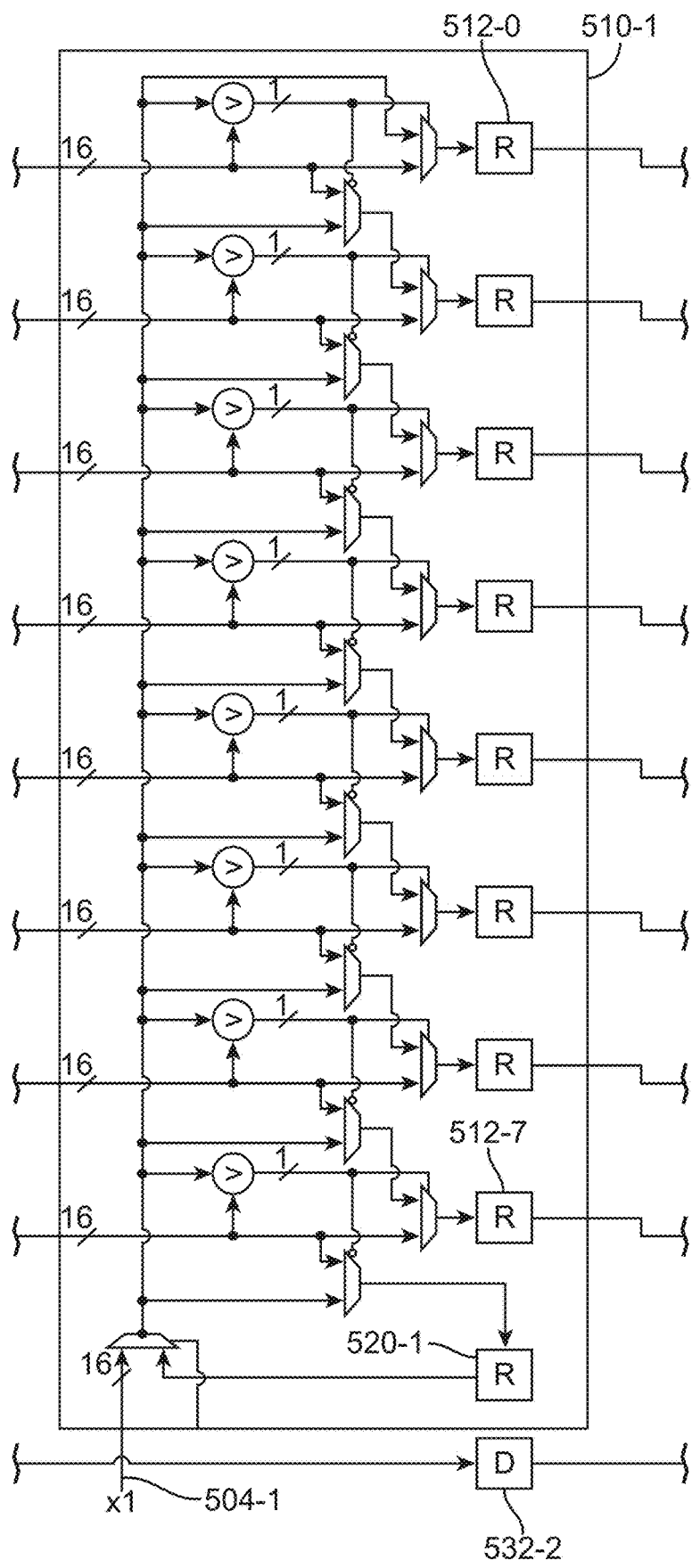
Figure 5C:
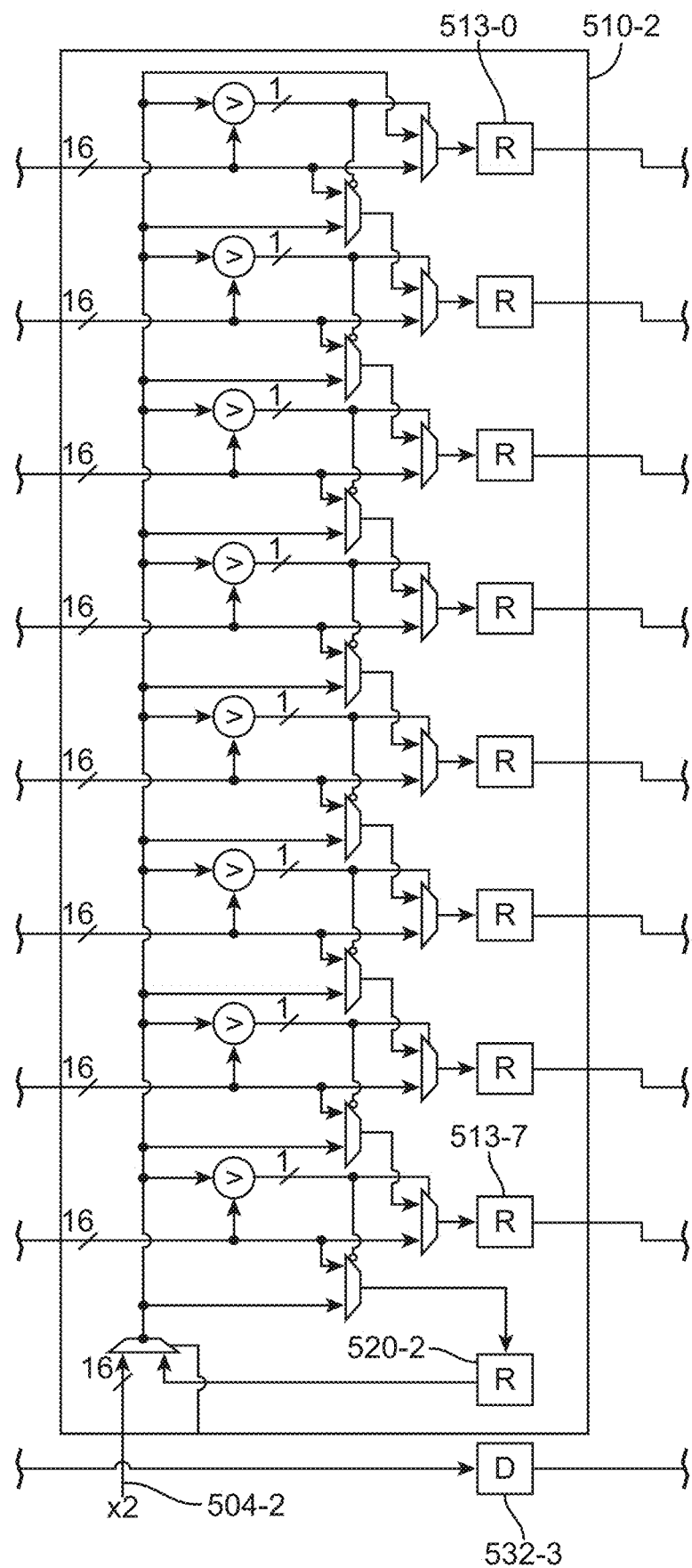
Figure 5D:
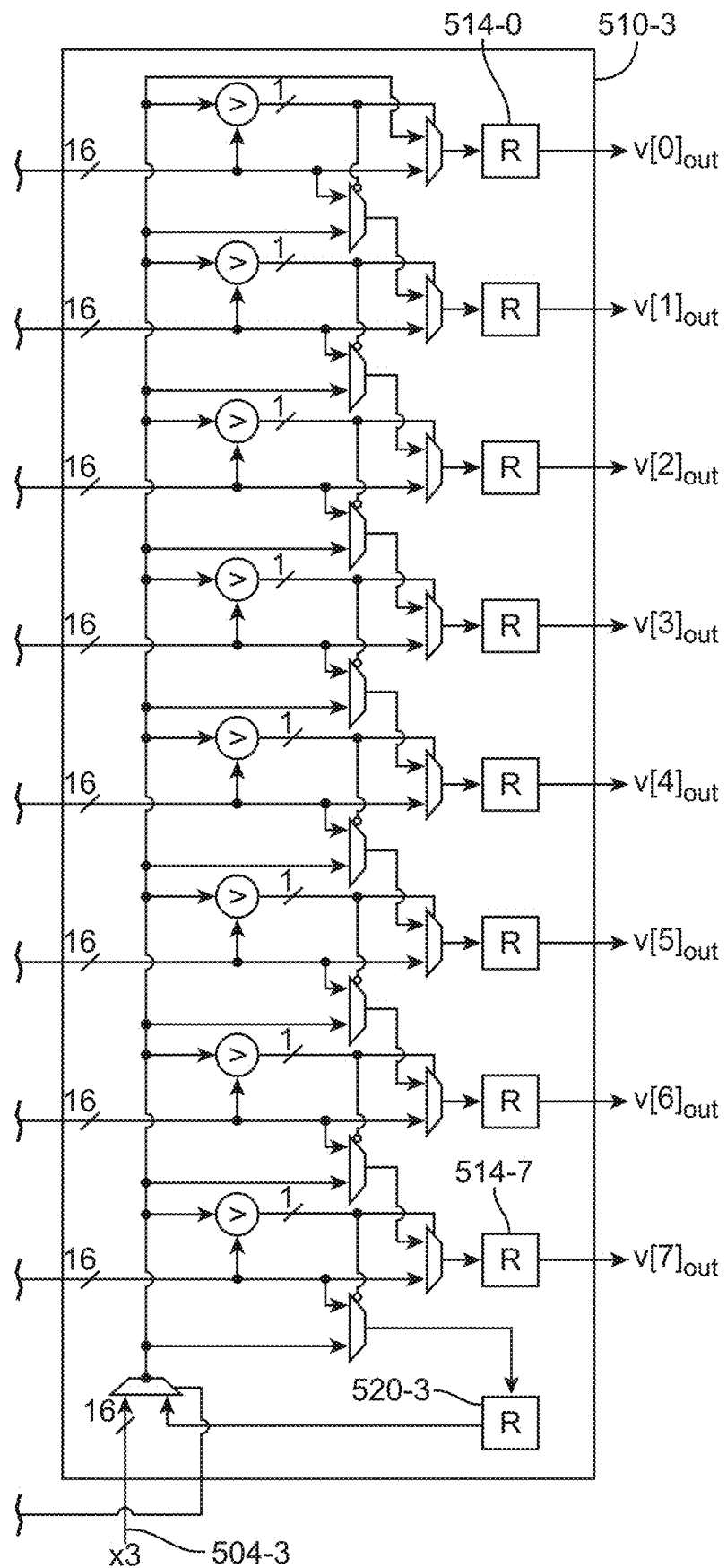

Some embodiments can provide even faster performance. By way of example, FIGS. 5A-5D together show a simplified schematic diagram of a vector sort circuit 500 according to some embodiments. Vector sort circuit 500 provides additional parallelism relative to vector sort circuit 300. In some embodiments, vector sort circuit 500 can insert four new elements (x0, x1, x2, x3) into a vector-sort database (not shown in FIGS. 5A-5D) per cycle while maintaining the vector-sort database in sorted order. Vector sort circuit 500 includes four cascaded sub-circuits 510-0 (shown in FIG. 5A) through 510-3 (shown in FIG. 5D), each of which can be an instance of vector sort circuit 300 of FIG. 3 described above. In circuit 500, sub-circuit 510-0 can receive a set of L=8 existing elements from a vector-sort database (not shown in FIGS. 5A-5D) via input paths 502. The output registers 511-0 through 511-7 of sub-circuit 510-0 are coupled to the input paths of sub-circuit 510-1; the output registers 512-0 through 512-7 of sub-circuit 510-1 are coupled to the input paths of sub-circuit 501-2, the output registers 513-0 through 513-7 of sub-circuit 510-2 are coupled to the input paths of sub-circuit 510-3, and the output registers 514-0 through 514-7 of sub-circuit 510-3 provide updated elements to the vector-sort database. Each sub-circuit 510-$j$ has a separate new-element input path 504-$j$, corresponding to new-element input path 304 of circuit 300. Each output path 504-$j$ can receive a different one of the new elements x0, x1, x2, x3 to be inserted into the vector-sort database. Counter logic 530 can be similar to counter logic 330 described above and can provide a control signal to first sub-circuit 510-0. The same control signal is propagated via delay circuits 532-1 through 532-3 to sub-circuits 510-1, 510-2, and 510-3. Each delay circuit 532-$j$ can introduce an equal amount of delay, which can be long enough for data to propagate through one of sub-circuits 510-$j$.

In operation, a set of four new elements x0, x1, x2, x3 can be provided concurrently to input paths 504-0 through 504-3. Sub-circuit 510-0 can receive a set of existing elements v[0] through v[7] from a vector-sort database and insert new element x0 into an appropriate position. The resulting set of eight elements (which may include new element x0) can be provided to sub-circuit 510-1 (instead of writing back to the vector-sort database). Operation of sub-circuit 510-1 can be delayed by delay circuit 532-1 long enough to allow elements to reach output registers 511-0 through 511-7 of sub-circuit 510-0. Accordingly, sub-circuit 510-1 can insert new element x1 into an appropriate position within the sorted set of elements output from sub-circuit 510-0. The resulting set of eight elements (which may include new element x0 and/or new element x1) can be provided to sub-circuit 510-2. Operation of sub-circuit 510-2 can be delayed by delay circuits 532-1 and 532-2 long enough to allow elements to reach the output registers 512-0 through 512-7 of sub-circuit 510-1. Accordingly, sub-circuit 510-2 can insert new element x2 into an appropriate position within the sorted set of elements output from sub-circuit 510-1. The resulting set of eight elements (which may include new element x0, new element x1, and/or new element x2) can be provided to sub-circuit 510-3. Operation of sub-circuit 510-3 can be delayed by delay circuits 532-1, 532-2, and 532-3 long enough to allow elements to reach the output registers 513-0 through 513-7 of sub-circuit 510-2. Accordingly, sub-circuit 510-3 can insert new element x3 into an appropriate position within the sorted set of elements output from sub-circuit 510-2. Data elements output to registers 514-0 through 514-7 by sub-circuit 510-3 (which may include any or all of new elements x0, x1, x2, and/or x3) can be written back into the vector-sort database.

As with circuit 300, each sub-circuit 510-$j$ can include a recirculation register 520-$j$. In instances where the size of the sorted database D exceeds the number of lanes L, the same iterative recirculation operation as in circuit 300 can be performed in each sub-circuit 510-$j$, with each sub-circuit 510-$j$ iterating in a cascading fashion. In some embodiments, the second iteration in sub-circuit 510-0 can begin before the first iteration in sub-circuit 510-3 is finished. For instance, the second iteration in sub-circuit 510-0 can begin as soon as its output elements are read by sub-circuit 510-1, or even earlier, provided that the output registers 511-0 through 511-7 of sub-circuit 510-0 are not overwritten before sub-circuit 510-0 reads them. Similar timing considerations apply to sub-circuits 510-1, 510-2, and 510-3. Any of new elements x0, x1, x2, and/or x3 can be inserted during any of the iterations, depending only on the metrics of the new and existing elements. It should also be noted that the circuit 500 can produce a correctly sorted vector-sort database regardless of whether x0, x1, x2, and x3 are provided in sorted order.

It will be appreciated that circuit 500 is illustrative and that variations and modifications are possible. For instance, while circuit 500 uses four cascaded instances of circuit 300 to insert four new elements per operation, more or fewer cascaded instances of circuit 300 can be provided, with each instance supporting insertion of one new element per operation. The choice of number of instances can be based on design tradeoffs between throughput and area: circuit 500 has four times the throughput of circuit 300 but consumes four times the area. As with circuit 300, the number L of lanes can be chosen as desired, and the number L of lanes and number of cascaded sub-circuits need not have any particular relationship. Sorting can be based on ascending or descending numeric metric as desired.

Circuits 300 and 500 and similar circuits maintain a vector-sort database in sorted order, with existing elements being shifted to lower positions as new elements having a higher metric are inserted. In some embodiments, the database need not be maintained in sorted order. Instead, each element can have a stored rank indicating the element's position in the sorted order. Such techniques are referred to herein as "in-place insertion sorting." In examples described herein, the rank (q) of an element can have a numeric value in the range from 0 through D−1, with each element having a unique rank, and the ranks are defined such that a lower numerical rank corresponds to a higher metric. Under this definition, q=0 is referred to as the "highest" rank (or the rank of the element with the highest metric) while q=D−1 is referred to as the "lowest" rank (or the rank of the element with the lowest metric). It should be understood that other definitions can be used to assign ranks, and in some embodiments higher numerical values may represent higher ranks.

The rank assigned to an existing element can be updated as new elements are inserted into the vector-sort database without changing the location of the existing element in the vector-sort database. The size of the vector-sort database can be limited, e.g., to D elements (where D is the number of elements desired in the sorted list), and after D elements have been inserted into the vector-sort database, new elements can be inserted by overwriting the element with the lowest metric.

Figure 6A:
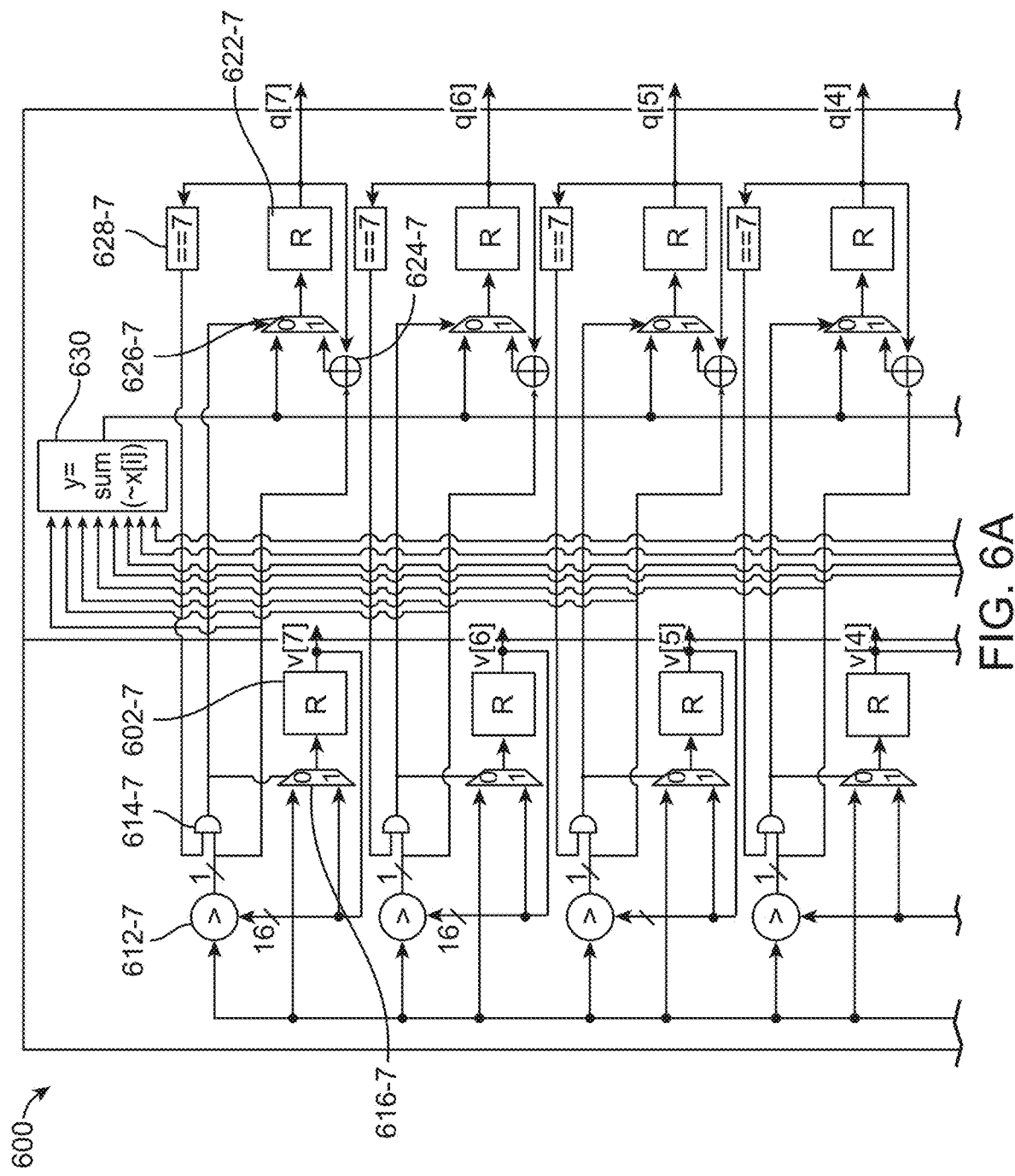
FIGS. 6A and 6B together show a simplified schematic diagram of a vector sort circuit according to some embodiments.
Figure 6B:
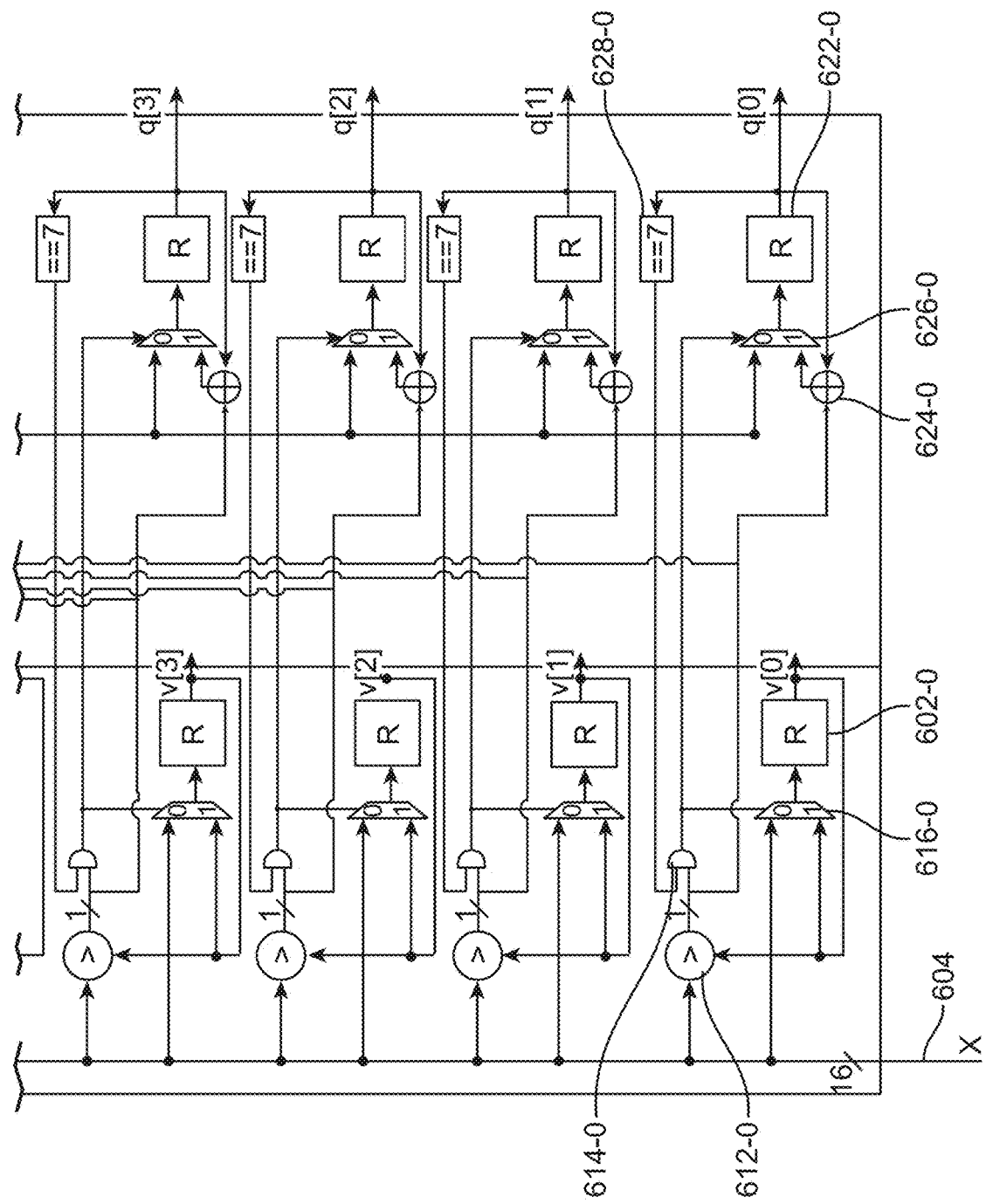

FIGS. 6A and 6B together show a simplified schematic diagram of a vector sort circuit 600 according to some embodiments. Vector sort circuit 600 can be used to insert a new element into a vector-sort database of size D using in-place insertion sorting. The structure and implementation of the vector-sort database can be similar to examples described above, except that for in-place insertion sorting, the vector-sort database also stores a rank for each element in association with the metric and the element ID (if used). Circuit 600 has a number (L) of lanes to enable multiple comparisons to be performed in parallel. In this example, circuit 600 has eight lanes, although it should be understood that the number L of lanes can be varied. As with circuits described above, in some embodiments, the number of lanes in a vector in-place sorting circuit can match the number of SIMD lanes in other functional units of a processing pipeline or other microprocessor in which the vector sort circuit is included. In this example, it is assumed that circuit 600 is coupled to a vector-sort database (not shown in FIGS. 6A and 6B) that stores a set of elements v[0] through v[D−1] in arbitrary order. Thus, the vector-sort database can include D elements. In some embodiments, D can be greater than L; where this is the case, circuit 600 can be operated iteratively (as described below) to insert a new element. For simplicity of description, circuit 600 will first be described for the case where D=L. However, this is not required, and examples of modifications to circuit 600 for operation with D>L are described below.

Circuit 600 can include a set of L=8 element registers 602-0 through 602-7, each of which can be loaded with the identifier and metric of an element v[0] through v[7] from a vector-sort database. (Input paths from the vector-sort database are not explicitly shown.) Circuit 600 can also include a set of L=8 rank registers 622-0 through 622-7, each of which can be loaded with the rank q[0] through q[7] for the corresponding element v[0] through v[7]. It is assumed that if the identifier and metric for a particular element v[i] are loaded into element register 602-i, the rank q[i] for that element v[i] is loaded into rank register 622-i. (Again, input paths from the vector-sort database are not explicitly shown.) A new element input path 604 can receive a new element x that is to be inserted into the vector-sort database. For each existing element v[i], circuit 600 includes decision logic to make two (correlated) determinations: (1) whether to change the rank q[i] in register 622-i; and (2) whether to overwrite the element v[i] in register 602-i with the new element x. In some embodiments, the rank q[i] is changed for each existing element that has a lower metric than the new element x, and the element v[i] with the lowest rank (and lowest metric) is overwritten with the new element x.

For instance, as shown in FIGS. 6A and 6B, circuit 600 can include a set of comparators 612-0 through 612-7. Each comparator 612-i can be coupled to new-element input path 604 and to element register 602-i. Thus, comparator 312-i can compare the metric of existing element v[i] and the metric of the new element x and generate a one-bit output signal. In this example, the one-bit output signal is "1" if the metric for the existing element v[i] is higher than the metric of the new element x and "0" otherwise.

To implement overwriting of the element v[i] having lowest rank with new element x, circuit 600 can also include a set of comparators 628-0 through 628-7, a set of two-input AND gates 614-0 through 614-7, and a set of multiplexers 616-0 through 616-7. Each multiplexer 616-i receives the existing element v[i] from element register 602-i as a first input and the new element x as a second input. Each comparator 628-i can be configured to compare the rank stored in register 622-i (which is the rank of element v[i]) to a lowest rank. (In this example, 7 is used as the lowest rank.) Each comparator 628-i can generate a one-bit output signal that has the value "1" if the rank is equal to the lowest rank and "0" otherwise. Each AND gate 614-i receives the output of comparator 612-i as one input and the output of comparator 628-i as the other input. Thus, AND gate 614-i produces a one-bit output signal that has value "1" if and only if: (1) the rank of element v[i] is equal to the largest rank; and (2) new element x has a metric higher than the metric of existing element v[i]. The output of AND gate 614-i is provided as a control signal to multiplexer 616-i, with the new element x being selected if the control signal is in the logical "1" state and the existing element v[i] being selected if the control signal is in the logical "0" state.

To support updating the ranks q[i] of the data elements, circuit 600 can include a set of incrementor circuits 624-0 through 624-7, a summation circuit 630, and a set of multiplexers 626-0 through 626-7. Each incrementor circuit 624-i receives the rank q[i] currently stored in rank register 622-i and the output signal from comparator 612-i. If the output signal from comparator 612-i is in the "1" state (or state signifying that existing element v[i] has a higher metric than new element x), incrementor circuit 624-i outputs the current rank q[i]. If the output signal from comparator 612-i is in the "0" state (or state signifying that existing element v[i] has a lower metric than new element x), incrementor circuit 624-i outputs an incremented rank q[i]+1. In some embodiments, each incrementor circuit 624-i can logically negate the input from comparator 612-i and add the result to the rank q[i] from rank register 622-i. The output of incrementor circuit 624-i is provided as a first input to multiplexer 626-i. Summation circuit 630 can determine the rank of new element x. In some embodiments, summation circuit 630 can add the outputs of all comparators 612-0 through 612-7 and provide the result (which corresponds to the rank of new element x) as a second input to each of multiplexers 626-0 through 626-7. Each multiplexer 626-i receives the output of AND gate 614-i as a control signal.

In operation, the vector-sort database can be initialized so that all elements v[i] have a default metric, which can be the lowest possible metric. For instance, in a descending numerical sort where the metric has only non-negative values, the default metric can be 0. Each element can be assigned a rank. In some embodiments, the element in row i of the database is assigned rank q[i]=i; other assignment algorithms can be used, as long as no two elements are assigned the same rank. Each element v[i] can be loaded into the corresponding element register 602-i, and the rank q[i] of element v[i] can be loaded into the corresponding rank register 622-i. When a new element x is received via input path 604, each comparator 612-i compares the metric of element x and the metric of existing element v[i]. If, for a given index i, the metric of the existing element v[i] is higher than the metric of the new element x, comparator 612-i outputs "1"; otherwise comparator 612-i outputs "0." Concurrently, each comparator circuit 628-i can compare the rank q[i] stored in rank register 622-$i$ to the lowest rank (7 in this example). Since each element has a different rank, one (and only one) of comparators 628-$i$ outputs a logical "1." If the metric of new element x is higher than the metric of at least one existing element v[i], then the one of AND gates 614-$i$ that corresponds to the element with lowest rank outputs a logical "1." The corresponding multiplexer 616-$i$ selects the new element x to be written to element register 602-$i$ while all other multiplexers 616-$i$ select the existing element v[i]. Thus, if the metric of the new element is higher than the metric of at least one existing element, the element with the lowest rank (lowest metric) is replaced by the new element.

In addition to replacing an element, ranks of all elements can be updated. For the new element, summation circuit 630 can produce an output equal to the number of "1" inputs received from comparators 612-0 through 612-7. Each incrementor circuit 624-$i$ can determine an updated rank for the existing element based on the existing rank q[i] from rank register 622-$i$ and the output of comparator 612-$i$. In some embodiments, incrementor circuit 624-$i$ can add 1 to the existing rank q[i] if the output of comparator 612-is logical "0" and add 0 to the existing rank q[i] if the output of comparator 612-$i$ is logical "1". Thus, if the metric of element x is higher than the metric of existing element v[i], then the updated rank is q[i]+1 (in other words, the existing element moves down one rank); otherwise, the updated rank is q[i] (in other words, the existing element retains its rank). Each multiplexer 626-$i$ selects either the updated rank from incrementor circuit 624-$i$ or the rank of new element x from summation circuit 630. Each multiplexer 626-$i$ is controlled by the same control signal that controls the corresponding multiplexer 616-$i$. Accordingly, if existing element v[i] in element register 602-$i$ is replaced by x, the rank q[i] in corresponding rank register 622-$i$ is replaced by the rank of new element x (which can be provided by summation circuit 630), and if existing element v[i] in element register 602-$i$ is not replaced, the rank q[i] in corresponding rank register 622-$i$ is replaced by the updated rank from incrementor circuit 624-$i$.

Figures 7A, 7B:
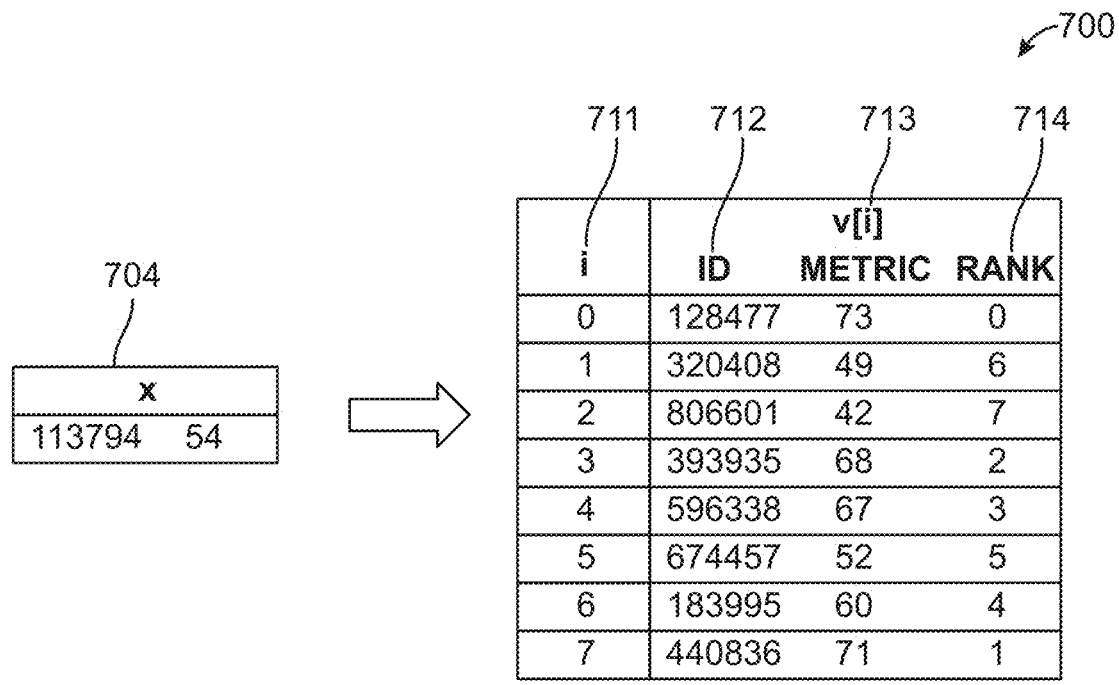
FIGS. 7A-7C illustrate a sorting operation according to some embodiments.
Figure 7C:
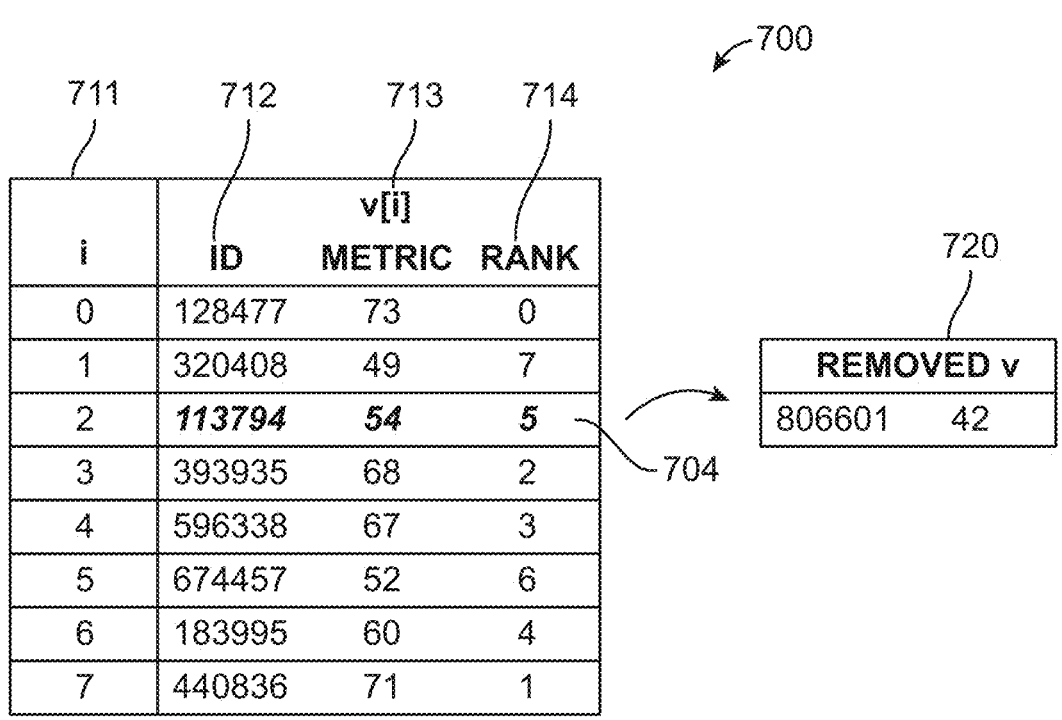

Operation of circuit 600 can be further understood with reference to FIGS. 7A-7C, which illustrate a sorting operation according to some embodiments. FIG. 7A shows a vector-sort database 700 containing eight elements (rows 702). For convenience of description, each row 702 is labeled with an index (i) from 0 to 7, as shown in column 711; in some implementations, the index is implicit in the memory location that stores each element, and storing an index is optional. Each element has an identifier (ID), shown in column 712, and a metric, shown in column 713. The identifier and the metric can be similar or identical to the identifier and metric in vector-sort database 400 described above. In vector-sort database 700, each element also includes a rank (q) shown in column 714. (The convention for ranking is as described above.) As can be seen, the rank represents a descending sort of the elements of database 700 according to the metric in column 713. It should be noted that the elements in vector-sort database 700 need not be stored in sorted order.

FIG. 7B shows a new element 704 being inserted into database 700. As can be seen, the element with index i=2 has the lowest rank (q=7 in this example) and should be replaced by new element 704. As can be seen by comparing metrics, new element 704 should be assigned rank 5, and existing elements with index i=5 (rank q[5]=5) and index i=1 (rank q[1]=6) should have their ranks incremented. Circuit 600 can effect these operations. The ID and metric of the existing elements of vector-sort database 700 can be loaded in parallel into element registers 602-0 through 602-7 such that the element with index i is loaded into register 602-$i$, and the ranks of the existing elements can be loaded into rank registers 622-0 through 622-7 such that the rank of the element with index i is loaded into register 622-$i$. New element 704 can be provided to circuit 600 via input path 604. Each comparator 612-$i$ can operate on the metric of element v[i] and the metric of new element x. In this example, comparators 612-0, 612-3, 612-4, 612-6, and 612-7 each produce output "1" while comparators 612-1, 612-2, and 612-5 each produce output "0." Summation circuit 630 produces an output value of 5 as the rank of the new element. Comparator 628-2 produces output "1" (since rank q[2]=7 is the highest rank in this example). Incrementor circuits 624-1, 624-2, and 624-5 each produce updated rank q[i]+1 (incrementing), while incrementor circuits 624-0, 624-3, 624-4, 624-6, and 624-7 each produce updated rank q[i] (not incrementing). Rank comparator 628-2 produces output "1" while all other rank comparators 628-$i$ produce output "0." AND circuit 614-2 produces output "1" while all other AND circuits 612-$i$ produce output "0." Accordingly, multiplexer 616-2 selects new element x to overwrite existing element v[2] in element register 602-2 while multiplexer 626-2 selects new rank 5 (from summation circuit 630) to overwrite the existing rank q[2] in rank register 622-2. All other multiplexers 616-$i$, 626-$i$ select the existing element v[i] and updated rank q[i] (either q[i] or q[i+1], depending on i). Consequently, as shown in FIG. 7C, new element 704 enters database 700 at index 2 with rank 5, and the element that was at index 2 is overwritten. Elements at index 1, 2, and 5 each have their rank incremented by 1 but do not change position. The stored rank for each element enables a sorted list to be produced at any point, simply by reading out the elements of the vector-sort database in rank order rather than index order. In this manner, circuit 600 can perform sorting without moving existing elements to new locations within a database. Further, in cases where D=L (or D<L), the sorted elements and ranks can be stored in registers 602 and 622 within circuit 600 throughout the sorting process. In such embodiments, registers 602 and 622 can act as the vector-sort database, and a separate storage location for the vector-sort database is not needed.

In some embodiments, the number of entries D in the vector-sort database can be greater than the number of lanes L in circuit 600. Where this is the case, a modified version of circuit 600 can be used. In the modified version, an iteration counter that counts from k=0 to k=(D/L)−1 can be provided, and comparators 628-$i$ can be modified to compare to the lowest rank for a D-element sort (which can be, e.g., D−1). A set of D element registers and D associated rank registers can be maintained, and switches can be provided such that L of the D element registers and the corresponding L of the D rank registers are active (e.g., coupled to the updating logic shown in FIGS. 6A and 6B) at a time. For instance, during iteration k, the existing elements at index i+k (for i=0, ..., L−1) can be active in element registers 602-$i$, and the corresponding ranks q[i+k] can be active in rank registers 622-$i$. Thus, for L=8, the first iteration can operate on elements v[0] through v[7], the second iteration on elements v[8] through v[15], and so on until all D elements have been operated on. Elements can be operated on in index order, without regard to rank order. The new element x can replace the lowest-ranking element during the iteration (k) in which the lowest-ranking element is active, and an identifier of the position (e.g., an index i+k) of the new element within the set of D element registers can be stored. To determine the rank of new element x, summation circuit 630 can maintain a running sum across all iterations (regardless of when the lowest ranking element is replaced by new element x). After the last iteration, the rank of new element x (e.g., the final sum from summation circuit 630) can be written to the rank register that corresponds to the element register (e.g., index i+k) where the new element x is now stored.

It will be appreciated that circuit 600 is illustrative and that variations and modifications are possible. For instance, while eight lanes are shown, any number L of parallel lanes can be provided. Similarly, while examples herein describe sorting by descending numeric metric, a sort by ascending numeric metric can be implemented in a similar circuit by reversing the outputs of the comparators. In some embodiments, the comparators can be reconfigurable to support either ascending or descending sort; examples are described below. In instances where two metrics being compared are equal, the comparator output is a matter of design choice. In examples described above, the rank q is defined such that lower numerical values of q correspond to higher metrics. Other schemes for representing rank can be implemented if desired. For example, it would be straightforward to implement a scheme in which lower numerical values of q correspond to lower metrics. (The numeric ordering of ranks can be defined independently of the numeric ordering of metrics, and the term "higher rank" should be understood as referring to a rank associated with an element having a higher metric rather than to a particular numerical value.)

In some embodiments, the parallelism of circuit 600 can be further increased in a manner analogous to circuit 500 of FIGS. 5A-5D. For instance, to insert four new elements (x0, x1, x2, x3) into a vector-sort database per operation, a "cascaded" version of circuit 600 can include four instances of the decision logic shown in FIGS. 6A-6B that determines whether to change the rank q[i] in register 622-*i* and whether to overwrite the element v[i] in register 602-*i* with the new element x. A first instance of the decision logic can receive new element x0 while a second instance receives new element x1, and so on. Switching circuitry can be configured such that each group of L element registers 602 and corresponding rank registers 622 is successively coupled to each instance of the decision logic. For instance, analogously to the operation of the cascaded sub-circuits in vector sort circuit 500 of FIGS. 5A-5D, initially the switching circuitry can couple a first group of L registers 602 and corresponding rank registers 622 to the first instance of the decision logic, which inserts element x0 in accordance with operations described above with reference to FIGS. 6A and 6B. The first group of L registers (with x0 now inserted if applicable) can then be coupled by the switching circuitry to the second instance of the decision logic, which inserts element x1 in accordance with operations described above with reference to FIGS. 6A and 6B, while a second group of L registers 602 and corresponding rank registers 622 is coupled to the first instance of the decision logic. In this manner, multiple new elements per operation can be sorted into the database. Those skilled in the art with the benefit of this disclosure will appreciate that more or fewer instances of the decision logic can be used to support inserting more or fewer new elements per operation. The choice of number of instances of the decision logic can be based on design tradeoffs between throughput and area: adding more instances of the decision logic increases throughput but also increases area. The number L of lanes can be chosen as desired, and the number L of lanes and number of instances of the decision logic need not have any particular relationship. Sorting can be based on ascending or descending numeric metric as desired. Additional optimizations can also be provided. For instance, in some embodiments look-ahead techniques can be employed to shorten the critical path. Other variations will also become apparent to those skilled in the art with the benefit of this disclosure.

Figure 8:
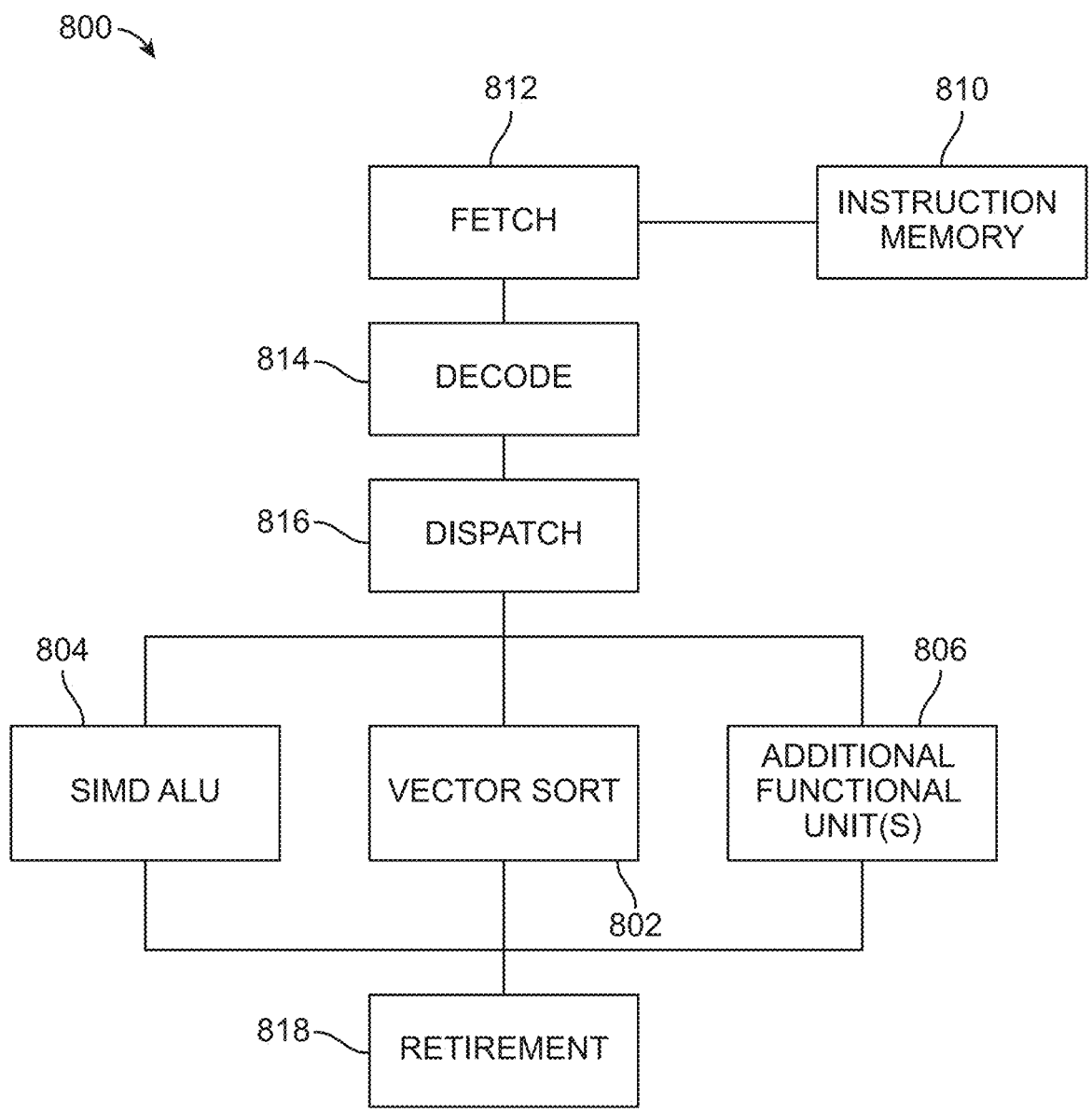
FIG. 8 shows a simplified block diagram of a microprocessor according to some embodiments.

In some embodiments, a vector sort circuit (e.g., circuit 300, circuit 500, or circuit 600) can be implemented as a functional unit in a microprocessor such as a programmable digital signal processor. FIG. 8 shows a simplified block diagram of a microprocessor 800 according to some embodiments. Microprocessor 800 can be a SIMD processor and can execute instructions in order or out-of-order as desired. Microprocessor 800 can include a set of functional units that execute various instructions. Examples of functional units include a vector sort unit 802, which can be include a vector sort circuit such as any of circuit 300, circuit 500, or circuit 600 described above. Other functional units can also be provided, such as a SIMD arithmetic logic unit (ALU) 804, which can implement vector operations such as vector addition, vector subtraction, vector negation, vector bitwise logic, and so on. In some embodiments, the number L of parallel lanes in SIMD ALU 804 can match the number of input registers (and output registers) in vector sort unit 802. Other functional units 806 can include, e.g., multipliers and/or special-purpose computation circuits, memory interface circuits that read data from and/or write data to external memory, and so on; some or all of functional units 806 can be SIMD functional units with L parallel lanes. Apart from aspects relevant to vector sort unit 802, components of microprocessor 800 can be generally conventional in design and operation. For example, an instruction memory 810 can include any memory circuit that stores program instructions to be executed by microprocessor 800. The instructions can be in machine-executable code and can be generated from program code written in a higher-level language. Fetch circuit 812 can fetch the instructions from instruction memory 810, generally in program order. In some embodiments, fetch circuit 812 can incorporate branch prediction, speculative fetch, and/or other optimizations as desired. Decode circuit 814 can perform any necessary decoding of the fetched instructions. In some embodiments, decoding can include converting the fetched instruction into one or more sequential microinstructions that can be delivered to functional units, including vector sort unit 802. Depending on implementation, other examples of decoding operations can include register renaming, memory address translation, memory access (e.g., to retrieve operands), etc. Dispatch circuit 816 can receive decoded instructions and send control signals to functional units 802, 804, 806 to execute the instructions, selecting the appropriate functional unit based on the particular instruction. Dispatch of instructions to functional units can proceed in order or out-of-order as desired. In some embodiments, dispatch circuit 816 can manage data dependencies so that instructions are not executed until their operands are ready. Retirement unit 818 can perform post-execution processing, such as moving output data out of output registers of the functional units, notifying dispatch circuit 816 of instruction completion, and so on. Any type of microprocessor architecture can be used, including pipelined architectures in which output data from one functional unit is provided as input data to a next functional unit in the pipeline, either directly or via a buffer.

To support operation of vector sort unit 802, the instruction set architecture of microprocessor 800 can include at least the following instructions:

(1) An initialization instruction (referred to herein as "VSORT_INIT") to initialize vector sort unit 802. For example, vector sort unit 802 can include or have access to a memory circuit that stores the vector-sort database. Initialization of vector sort unit 802 can include initializing the vector-sort database, e.g., by initializing the metric of each element to a lowest value (or an "invalid" value signifying that the element is not yet populated). In embodiments where the vector-sort database stores a rank for each element (e.g., embodiments using circuit 600 or similar circuits to perform in-place insertion sorting), the rank of each element can be initialized by assigning each element a unique rank, e.g., as described above. In some embodiments, the VSORT_INIT instruction may specify the number D of elements to include in the sorted output, and the number D can be used, e.g., to configure the vector-sort database, the iteration counter (if applicable), and any rank comparators that may be present (e.g., rank comparators 628 in circuit 600). In some embodiments, the VSORT_INIT instruction may specify the direction of sort (e.g., whether a higher metric corresponds to a smaller or larger numerical value), and initialization can include configuring the metric comparators of vector sort unit 802 (e.g., comparators 312 in circuit 300 or comparators 612 in circuit 600) according to the direction of sort.

(2) A sort instruction (referred to herein as "VSORT") to operate vector sort unit 802 to sort a new data element into the vector-sort database. For example, where vector sort unit 802 includes vector sort circuit 300 or vector sort circuit 600, the VSORT instruction can include an operand specifying the new data element x. Where vector sort unit 802 includes a multi-input vector sort circuit (such as circuit 500), the operand can specify multiple new data elements. The particular mechanism for providing the new data element x and triggering operation of the sorting circuit depends on the particular architecture of microprocessor 800.

(3) A writeback instruction (referred to herein as "VSORT OUTPUT") to write a sorted list of data elements from the vector-sort database to an output location. For example, where vector sort unit 802 uses vector sort circuit 300 or vector sort circuit 500, the vector-sort database is maintained in sorted order, and a sorted list can be output by reading out the vector-sort database in row-index order. As another example, where vector sort unit 802 uses in-place sort circuit 600, the vector-sort database includes a rank q for each element, and a sorted list can be output by reading out the vector-sort database in order of rank q (from highest rank to lowest rank). In some embodiments, the VSORT OUTPUT instruction can include an operand that specifies a destination location for the sorted output.

Figure 9:
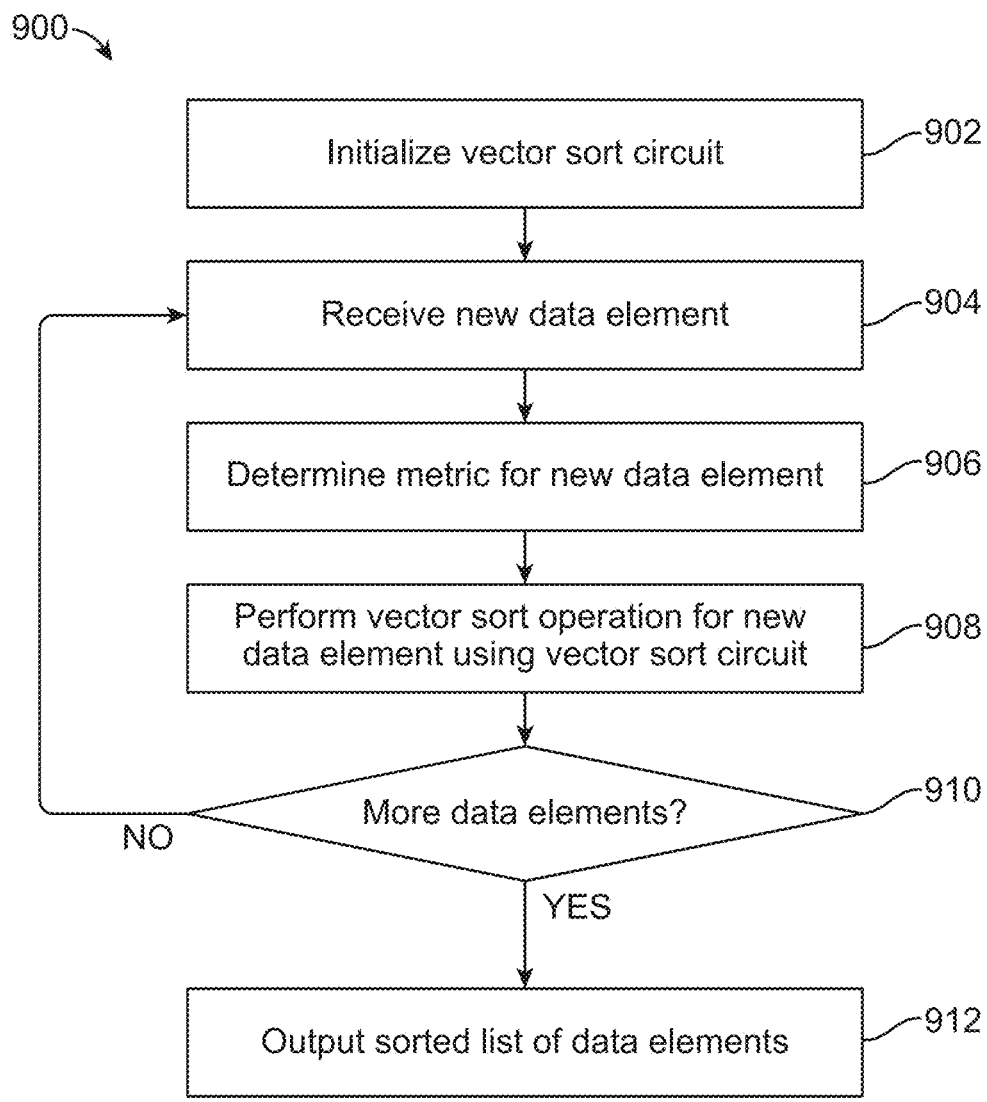
FIG. 9 is a flow diagram of a process that implements a vector sort according to some embodiments.

Using these instructions, vector sorting can be efficiently implemented in software that invokes the operation of vector sort unit 802. FIG. 9 is a flow diagram of a process 900 that implements a vector sort according to some embodiments. Process 900 can be implemented, e.g., in microprocessor 800 with vector sort unit 802 incorporating circuit 300 (or circuit 600). For example, process 900 can be expressed as program instructions executable by microprocessor 800. It is assumed that an input data set x of some length (N) is available and that N can be greater than L or D. The length N can be but need not be specified in advance. For example, the input data set can be a digital data stream that is received and processed in real time.

At block 902, vector sort unit 802 can be initialized, e.g., by executing a VSORT_INIT instruction as described above. At block 904, a new data element x can be received, and at block 906, a metric for the new data element can be determined. In some embodiments, the metric is previously computed and provided with the data element at block 904. In other embodiments, a computation may be performed to determine the metric for the new data element. Particular techniques for computing a metric are not relevant to understanding the present disclosure. At block 908, a vector sort operation for the new data element can be performed. For instance, a VSORT instruction can be issued to vector sort unit 802, specifying the new data element as operand. The VSORT instruction can be executed using a vector sort circuit in functional unit 802, which can be, e.g., vector sort circuit 300 or vector sort circuit 600, to insert the new data element into the vector-sort database maintained by vector sort unit 802. At block 910, if more data elements remain to be sorted, process 900 can return to block 904 to receive and sort the next data element. If, at block 910, no more elements remain to be sorted, then at block 912, the sorted list of data elements can be output, e.g., by executing a VSORT OUTPUT instruction as described above. Thereafter, process 900 can end. Other processing operations, including operations using the sorted output, can be performed as desired.

It will be appreciated that process 900 is illustrative and that variations and modifications are possible. For instance, in some embodiments, executing the VSORT OUTPUT instruction does not affect the contents of the vector-sort database, and insertion of additional elements into the same vector-sort database can continue after executing VSORT OUTPUT. A new sort can be started by executing another VSORT_INIT instruction.

Process 900 or similar processes can be used to operate a vector sort circuit in any situation where sorting of an input data set in a microprocessor is desired. In embodiments where a cascaded vector sort circuit (e.g., circuit 500) is available, a VSORT instruction with multiple input operands can be used to sort multiple new data elements into a vector-sort database in a single operation.

Those skilled in the art with access to the present disclosure will appreciate that the foregoing examples of vector sort circuits and sorting operations are illustrative and that vector sort circuits can be deployed and used in any context where sorting of a list of data values is desired.

While specific embodiments have been described, those skilled in the art will appreciate that variations and modifications are possible. For instance, a vector sort circuit can include any number of lanes and can process one or more new data elements per operation. Data can be in any format, including fixed-point (or integer), floating-point, real values, complex values, etc. The metric used for sorting can be any property having values that can be ordered from highest to lowest. In examples described above, the metrics have numerical values, and those skilled in the art will appreciate that numerical values can be assigned to a variety of properties. It should be understood that in some applications, the highest metric may correspond to the lowest numerical value, while in other applications, the highest metric may correspond to the highest numerical value. As noted above, in some embodiments comparators can be reconfigured appropriately for a desired sorting operation, e.g., for either ascending or descending numerical sort.

A vector-sort database can contain any amount of information for each data element. In examples shown herein, each data element is represented in the vector-sort database by a metric and a unique identifier (and a rank where in-place sorting is implemented). It should be understood that other information pertaining to specific data elements can be stored in some other memory area in association with the identifier. If desired, all information about each data element can be included in the vector-sort database; however, this may increase the amount of data that needs to be stored and/or moved for each element. In embodiments where the only desired output is a sorted list of metrics, data-element identifiers need not be maintained in the vector-sort database.

In some embodiments, a vector sort circuit can be used in a multithreaded processing environment. For instance, a vector sort circuit can have multiple vector-sort databases, each associated with a different thread. When switching between threads, settings associated with the sort (e.g., the sorted set size D, whether to sort by ascending or descending metric) can be saved to a context buffer associated with the thread being switched out, and settings associated with a different thread can be read in from the appropriate context buffer. A received data value can be sorted into the vector-sort database associated with the currently active thread.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise" or "can arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must). The word "can" is used herein in the same permissive sense (i.e., having the potential to, being able to).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set {w, x, y, z}, these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set {w, x, y, z}, thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, Applicant will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A vector sort circuit comprising:
a number (L) of existing-element input paths, wherein L is greater than 1, the existing-element input paths being configured to receive a respective one of a plurality of existing data elements from a vector-sort database, wherein the received existing data element includes a metric;
a new-element input path configured to receive a new data element, wherein the new data element includes a metric;
a set of L output registers; and
a chain of L compare-and-exchange circuits including a first compare-and-exchange circuit and a last compare-and-exchange circuit, the compare-and-exchange circuits coupled to a corresponding one of the L existing-element input paths and to the new-element input path, wherein the compare-and-exchange circuits have a high output path and a low output path, wherein the high output paths of the compare-and-exchange circuits are coupled to a corresponding one of the L output registers, and wherein the low output paths of the compare-and-exchange circuits except the last compare-and-exchange circuit are coupled to a next one of the compare-and-exchange circuits,
wherein the chain of L compare-and-exchange circuits is configured such that the set of L output registers receives a sorted set of output data elements including the new data element and at least some of the existing data elements, wherein the output data elements are sorted according to the metrics of the existing data elements and the new data element.

2. The vector sort circuit of claim 1 wherein the first compare-and-exchange circuit includes:
a comparator configured to receive the metric of a first one of the existing data elements via a first one of the L existing-element input paths and the metric of the new data element via the new-element input path and to generate an output signal indicating whether the metric of the first one of the existing data elements is higher or lower than the metric of the new data element;
a first multiplexer having a first input coupled to the new-element input path, a second input coupled to the first one of the L existing-element input paths, an output coupled to the low output path of the first compare-and-exchange circuit, and a control input configured to receive the output signal from the comparator; and
a second multiplexer having a first input coupled to the first one of the L existing-element input paths, a second input coupled to the new-element input path, an output coupled to the high output path of the first compare-and-exchange circuit, and a control input configured to receive the output signal from the comparator,
wherein, when the metric of the first one of the existing data elements is higher than the metric of the new data element, the first multiplexer outputs the first one of the existing data elements and the second multiplexer outputs the new data element and, when the metric of the first one of the existing data elements is lower than the metric of the new data element, the second multiplexer outputs the first one of the existing data elements and the first multiplexer outputs the new data element.

3. The vector sort circuit of claim 2 where respective ones of the compare-and-exchange circuits other than the first compare-and-exchange circuit include:
a comparator configured to receive the metric of a corresponding one of the existing data elements via the corresponding one of the L existing-element input paths and the metric of the new data element via the new-element input path and to generate an output signal indicating whether the metric of the corresponding one of the existing data elements is higher or lower than the metric of the new data element;

a first multiplexer having a first input coupled to the new-element input path, a second input coupled to the corresponding one of the L existing-element input paths, an output coupled to the low output path of the respective one of the compare-and-exchange circuits, and a control input configured to receive the output signal from the comparator; and a second multiplexer having a first input coupled to the corresponding one of the L input paths, a second input coupled to the low output path of a preceding one of the compare-and-exchange circuits, an output coupled to the high output path of the respective one of the compare-and-exchange circuits, and a control input configured to receive the output signal from the comparator, wherein, when the metric of the corresponding one of the existing data elements is higher than the metric of the new data element, the first multiplexer outputs the corresponding one of the existing data elements and the second multiplexer outputs the new data element and, when the metric of the corresponding one of the existing data elements is lower than the metric of the new data element, the first multiplexer outputs the corresponding one of the existing data elements and the second multiplexer outputs a data element received via the low output path of the preceding one of the compare-and-exchange circuits.

4. The vector sort circuit of claim 1 wherein a number (D) of entries in the vector-sort database exceeds the number L of existing-element input paths and wherein the vector sort circuit further comprises:

a recirculation register coupled to the low output path of the last compare-and-exchange circuit;

counter logic configured to execute a plurality of iterations of the vector sort circuit and to select a different set of L existing data elements from the vector-sort database during each iteration; and a recirculation multiplexer having an output coupled to the new-element input path, wherein the recirculation multiplexer is configured to output a newly received data element onto the new-element input path during a first iteration and to output a recirculation value from the recirculation register during each iteration other than the first iteration.

5. A vector sort circuit comprising:

a plurality of element registers, the element registers being configured to store a respective one of a plurality of existing data elements, wherein the existing data elements include respective metrics;

a plurality of rank registers, the rank registers associated with a corresponding one of the element registers, the rank register being configured to store a rank associated with the existing data element in the corresponding one of the element registers, wherein the existing data elements have different ranks from a highest rank to a lowest rank;

a new-element input path configured to receive a new data element, wherein the new data element includes a metric; and update logic coupled to the new-element input path, the element registers and the rank registers, the update logic being configured to:

determine a rank of the new data element based on the metrics of the existing data elements and the new data element;

identify which one of the rank registers is storing the lowest rank;

replace the existing data element stored in the element register corresponding to the rank register storing the lowest rank with the new data element and replace the rank stored in the rank register storing the lowest rank with the rank of the new data element; and update the rank to a next lower rank for each rank register having a rank equal to or lower than the rank of the new data element, wherein the update logic is configured to operate in parallel on a number (L) of the element registers and the number L of the rank registers, wherein the number L is at least two.

6. The vector sort circuit of claim 5 wherein the update logic includes:

a plurality of metric comparators associated with corresponding ones of the element registers, the metric comparators being configured to receive the metric of the existing data element from the corresponding one of the element registers and the metric of the new data element and to generate an output signal indicating whether the metric of the corresponding one of the existing data elements is higher or lower than the metric of the new data element.

7. The vector sort circuit of claim 6 wherein the update logic further includes:

a plurality of rank comparators associated with corresponding ones of the rank registers and configured to generate an output signal indicating whether the rank stored in the corresponding one of the rank registers is the lowest rank.

8. The vector sort circuit of claim 7 wherein the update logic further includes:

a plurality of element multiplexers associated with corresponding ones of the element registers and having a first input coupled to the new-element input path, a second input coupled to the corresponding one of the element registers, and an output coupled to the corresponding one of the element registers, wherein the element multiplexers are configured to output the new data element when: (i) the output signal of the corresponding one of the metric comparators indicates that the metric of the corresponding one of the existing data elements is lower than the metric of the new data element; and (ii) the output signal of the corresponding one of the rank comparators indicates that the rank stored in the corresponding one of the rank registers is the lowest rank; and otherwise to output the existing data element.

9. The vector sort circuit of claim 6 wherein the update logic further includes:

a summation circuit configured to determine and output the rank of the new data element based on the output signals from the metric comparators.

10. The vector sort circuit of claim 9 wherein the update logic further includes:

a plurality of incrementor circuits having a first input coupled to a corresponding one of the rank registers, a second input coupled to the output signal of the corresponding one of the metric comparators, and an output, the incrementor circuits being configured to output an updated rank, wherein the updated rank is equal to the rank stored in the corresponding one of the rank registers when the existing data element in the corresponding one of the element registers has a higher metric than the new data element and the updated rank is one rank lower than the rank stored in the corresponding one of the rank registers when the existing data element in the corresponding one of the element registers has a lower metric than the new data element.

11. The vector sort circuit of claim 10 wherein the update logic further includes:
a plurality of rank multiplexers having a first input coupled to the output of a corresponding one of the incrementor circuits, a second input coupled to an output of the summation circuit, and an output coupled to the corresponding one of the rank registers,
wherein the rank multiplexers are configured to output the rank of the new data element from the output of the summation circuit when: (i) the metric of the corresponding one of the existing data elements is lower than the metric of the new data element; and (ii) the rank stored in the corresponding one of the rank registers is the lowest rank; and otherwise to output the updated rank from the corresponding one of the incrementor circuits.

12. The vector sort circuit of claim 5 wherein:
the plurality of element registers includes a number (D) of element registers;
the plurality of rank registers includes a number (D) of rank registers;
the number D is greater than the number L; and
the update logic is configured to execute a plurality of iterations to operate on different subsets of L of the element registers and L of the rank registers.

13. A microprocessor comprising:
a memory circuit configured to store a vector-sort database having a plurality of data elements, wherein the data elements include respective metrics; and
a vector sort functional unit coupled to the memory circuit and configured to execute a vector sort initialization instruction and a vector sort instruction,
wherein executing the vector sort initialization instruction includes initializing the vector-sort database to an empty state, and
wherein executing the vector sort instruction includes operating a vector sort circuit to read a number (L) of existing data elements in parallel from the vector-sort database, compare, in parallel, a metric of each of the L existing data element to a metric of a new data element, and output a number L of updated data elements to the vector-sort database based on the metrics, wherein the number L is at least two.

14. The microprocessor of claim 13 wherein the vector sort circuit is configured to move data elements within the vector-sort database such that the data elements in the vector-sort database are stored in a sorted order.

15. The microprocessor of claim 13 wherein the data elements in the vector-sort database include respective ranks and the vector sort circuit is further configured to update the ranks of the data elements in the vector-sort database to represent a sorted order.

16. The microprocessor of claim 15 wherein the vector sort circuit is further configured to identify the data element in the vector database having a lowest rank and to replace the data element having the lowest rank with a new data element when the metric of the new data element is higher than the metric of at least one of the existing data elements.

17. The microprocessor of claim 13 wherein the vector sort circuit includes:
a plurality of element registers, the element registers being configured to store a respective one of a plurality of existing data elements;
a plurality of rank registers, the rank registers associated with a corresponding one of the element registers, the rank register being configured to store a rank associated with the existing data element in the corresponding one of the element registers, wherein the existing data elements have different ranks from a highest rank to a lowest rank;
a new-element input path configured to receive the new data element; and
update logic coupled to the new-element input path, the element registers and the rank registers, the update logic being configured to:
determine a rank of the new data element based on the metrics of the existing data elements and the new data element;
identify which one of the rank registers is storing the lowest rank;
replace the existing data element stored in the element register corresponding to the rank register storing the lowest rank with the new data element and replace the rank stored in the rank register storing the lowest rank with the rank of the new data element; and
update the rank to a next lower rank for each rank register having a rank equal to or lower than the rank of the new data element,
wherein the update logic is configured to operate in parallel on the number L of the element registers and the number L of the rank registers.

18. The microprocessor of claim 13 wherein the vector sort circuit includes:
a number L of existing-element input paths configured to receive respective ones of the L existing data elements from the vector-sort database;
a new-element input path configured to receive the new data element;
a set of L output registers; and
a chain of L compare-and-exchange circuits including a first compare-and-exchange circuit and a last compare-and-exchange circuit, the compare-and-exchange circuits coupled to a corresponding one of the L existing-element input paths and to the new-element input path, wherein the compare-and-exchange circuits have a high output path and a low output path, wherein the high output paths of the compare-and-exchange circuits are coupled to a corresponding one of the L output registers, and wherein the low output paths of the compare-and-exchange circuits except the last compare-and-exchange circuit are coupled to a next one of the compare-and-exchange circuits,
wherein the chain of L compare-and-exchange circuits is configured such that the set of L output registers receives a sorted set of output data elements including the new data element and at least some of the existing data elements, wherein the output data elements are sorted according to the metrics of the existing data elements and the new data element.

19. The microprocessor of claim 13 wherein the vector sort circuit is configured to receive a plurality of new data elements in parallel, wherein the new data elements include respective metrics, and to sort the plurality of new data elements into the vector-sort database in a single operation.

20. The microprocessor of claim 19 wherein the vector sort circuit includes a plurality of cascaded sub-circuits including:
a number L of existing-element input paths configured to receive a respective one of a plurality of existing data elements, wherein a first sub-circuit of the plurality of cascaded sub-circuits is configured to read the number L of existing data elements in parallel from the vector-sort database;

a new-element input path configured to receive a different one of the plurality of new data elements;

a set of L output registers; and a chain of L compare-and-exchange circuits including a first compare-and-exchange circuit and a last compare-and-exchange circuit, the compare-and-exchange circuit coupled to a corresponding one of the L existing-element input paths and to the new-element input path, wherein the compare-and-exchange circuit has a high output path and a low output path, wherein the high output path is coupled to a corresponding one of the L output registers, and wherein the low output path of the compare-and-exchange circuits except the last compare-and-exchange circuit is coupled to a next one of the compare-and-exchange circuits, wherein the chain of L compare-and-exchange circuits is configured such that the set of L output registers receives a sorted set of output data elements including the new data element and at least some of the existing data elements, wherein the output data elements are sorted according to the metrics of the existing data elements and the new data element, wherein the L output registers of a last sub-circuit of the plurality of cascaded sub-circuits are configured to write the sorted set of output data elements to the vector-sort database, and wherein the L output registers of the plurality of cascaded sub-circuits other than the last sub-circuit are coupled to the L existing-element input paths of a next one of the plurality of cascaded sub-circuits.

* * * * *